United States Patent
Shrivastava et al.

(10) Patent No.: US 12,205,202 B2
(45) Date of Patent: Jan. 21, 2025

(54) GENERATING REAL-TIME INFERRED NETWORK GRAPHS

(71) Applicant: Microsoft Technology Licensing, LLC, Redmond, WA (US)

(72) Inventors: Harsh Shrivastava, Redmond, WA (US); Maurice Diesendruck, Bellevue, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 17/833,221

(22) Filed: Jun. 6, 2022

(65) Prior Publication Data

US 2023/0394722 A1    Dec. 7, 2023

(51) Int. Cl.
*G06T 11/20* (2006.01)
*G06F 16/901* (2019.01)

(52) U.S. Cl.
CPC ........ *G06T 11/206* (2013.01); *G06F 16/9024* (2019.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2008/0052379 A1* | 2/2008 | Matsuyama | ............ | H04L 41/22 709/218 |
| 2008/0318563 A1* | 12/2008 | Ross | ............ | G16H 40/67 455/418 |
| 2023/0214949 A1* | 7/2023 | Eidelman | ............ | G06Q 50/18 705/311 |
| 2023/0252700 A1* | 8/2023 | Barlew | ............ | G06T 11/206 345/440 |

OTHER PUBLICATIONS

Hadar, "Should I Train a Model for Each Customer or Use One Model for All of My customers?", downloaded @ https://towardsdatascience.com/should-i-train-a-model-for-each-customer-or-use-one-model-for-all-of-my-customers-f9e8734d991, Aug. 2021 (Year: 2021).*

Erdogan, "How to Build an User Specific Machine Learning Model?", downloaded @ https://learn.microsoft.com/en-us/answers/questions/620019/how-to-build-an-user-specific-machine-learning-mod, Nov. 2021 (Year: 2021).*

* cited by examiner

*Primary Examiner* — Yingchun He
(74) *Attorney, Agent, or Firm* — Ray Quinney & Nebeker; Chris Hallstrom

(57) ABSTRACT

The present disclosure relates to systems, methods, and computer-readable media for utilizing an interactive graphing system to achieve improved dataset exploration utilizing an intelligent workflow and an interactive user interface. More specifically, the interactive graphing system facilitates generating updated network graphs that include inferred user influences based on implicit user action. Indeed, the interactive graphing system can automatically generate and present a user with an updated network graph that includes added, removed, or subsetted elements and relationships that are otherwise hidden from a user. Additionally, the interactive graphing system facilitates network graph exploration and processing of customized combined network graphs that join otherwise separate network graphs.

20 Claims, 14 Drawing Sheets

GENERATING REAL-TIME INFERRED NETWORK GRAPHS

BACKGROUND

Recent years have seen significant advancements in both hardware and software with respect to accessing, managing, and sharing digital content. For instance, modern computing systems allow researchers and other individuals to identify, access, and utilize large collections of digital content. Indeed, modern computing systems provide the processing power, memory, and connectivity needed to process large collections of digital content, such as generating and providing network graphs that show relationships between elements (e.g., nodes) using links (e.g., edges).

Despite these and other advances, existing computing systems face several technical shortcomings that result in inaccurate, inflexible, and inefficient operations, particularly in the area of dataset exploration using network graphs (e.g., visually exploring large datasets). To illustrate, while some existing computing systems provide the ability to generate network graphs, these conventional systems are rigidly limited in their ability to provide additional functionality. For example, many existing systems do not allow users to customize (e.g., add nodes, modify connections, or define connection strengths) network graphs. In particular, many existing systems do not allow combining separate network graphs into a combined network graph, especially if the separate network graphs correspond to different subject matter areas.

Additionally, many existing systems enable executing one or more graph-based models on network graphs. However, these existing systems are inflexibly limited to running models on existing network graphs generated by the system. Indeed, these and other existing systems do not allow running graph-based models on customized network graphs. In particular, existing systems do not allow executing graph-based models on customized combined network graphs that includes nodes from different network graphs and/or customized user nodes. Due to this lack of functionality, existing systems cannot produce accurate graph-processing results.

Moreover, many existing systems provide passive functionality with respect to network graphs. For example, existing systems often run graph-based models in response to explicit user commands and only on existing network graphs. However, these existing systems lack the functionality to generate exploratory network graphs or process these exploratory network graphs. Further, many existing systems do not operate in real time as well as consume large amounts of computing resources unnecessarily.

These and other problems result in significant inaccuracies, inflexibilities, and inefficiencies of existing computing systems with respect to graph dataset exploration.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
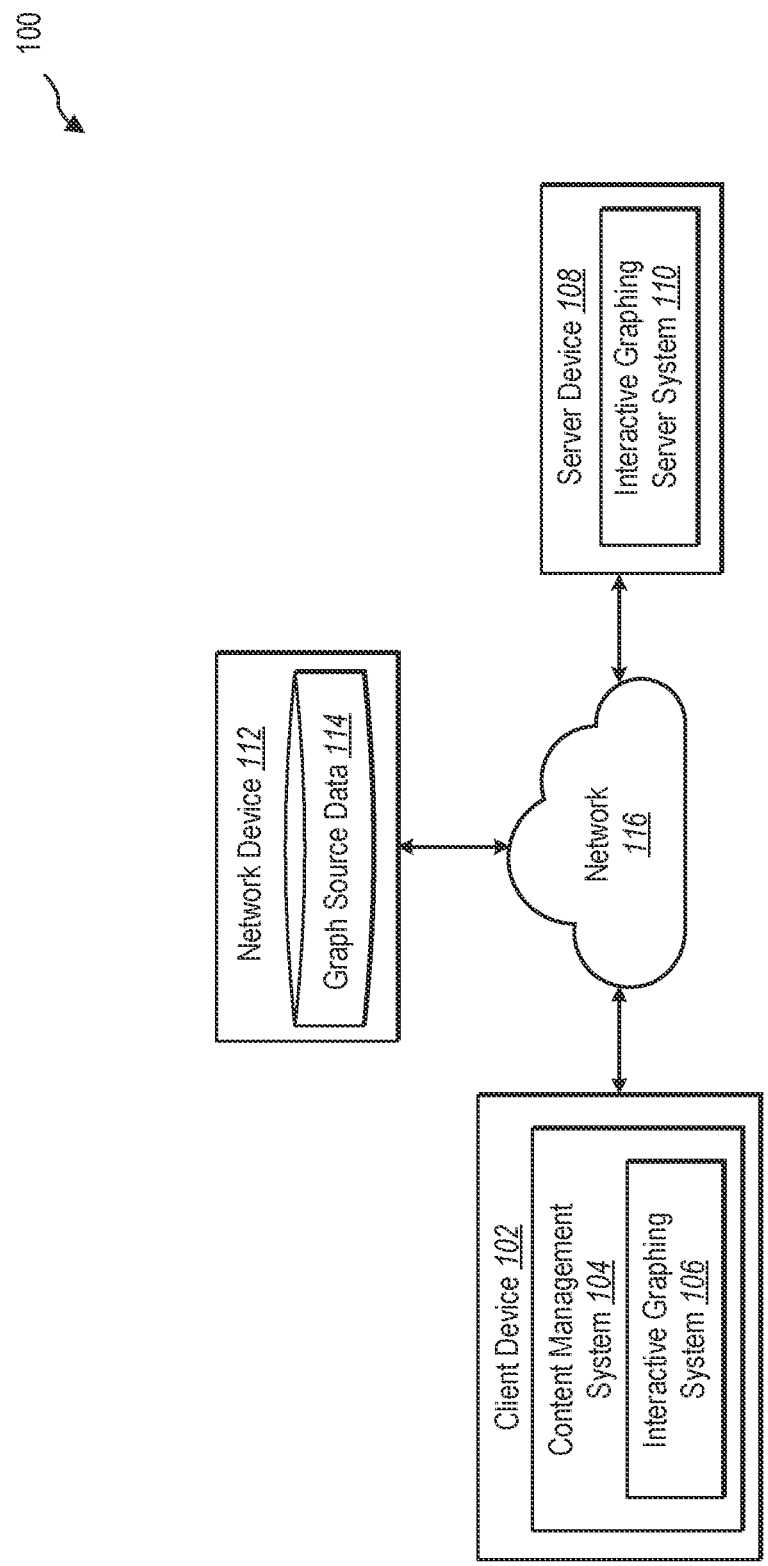
FIGS. 1A-1B illustrate a diagram of a computing system environment where an interactive graphing system is implemented in accordance with one or more implementations.

Implementations of the present disclosure provide benefits and/or solve one or more of the foregoing or other problems in the art with systems, non-transitory computer-readable media, and methods that provide an interactive graphing system to achieve improved dataset exploration utilizing an intelligent workflow and an interactive user interface. More specifically, the interactive graphing system facilitates generating updated network graphs that include inferred user influences based on implicit user action. Indeed, the interactive graphing system can automatically generate and present a user with an updated network graph that includes added, removed, or subsetted elements and relationships that are otherwise hidden from a user. Additionally, the interactive graphing system facilitates network graph exploration and processing of customized combined network graphs that join otherwise separate network graphs.

To illustrate, in one or more implementations, the interactive graphing system provides an interactive interface that displays a network graph having nodes and connecting edges. In addition, the interactive graphing system can generate a modified network graph based on detecting user input modifying a network graph. Further, the interactive graphing system can update a user profile based on detecting the user input. Additionally, the interactive graphing system can generate an updated network graph utilizing a graph-based model based on the modified network graph and the user profile and provide the updated network graph in response to detecting the user input modifying the network graph.

As described herein, the interactive graphing system provides several technical benefits in terms of computing accuracy, flexibility, and efficiency compared to existing computing systems. Indeed, the interactive graphing system provides several practical applications that deliver benefits and/or solve problems associated with graph dataset exploration.

To illustrate, in various implementations, the interactive graphing system improves accuracy and flexibility by enabling a user to edit a network graph and/or perform actions on the network graph and utilizing the user actions to provide future network graph recommendations. For example, in various implementations, the interactive graphing system detects user actions with respect to modifying and/or processing a network graph. For instance, the interactive graphing system detects a user modifying a network graph by adding/removing nodes and/or performing actions, such as performing graph analytical computations or focusing on a sub-area of the network graph.

In some instances, the interactive graphing system maintains a repository of previous user actions in connection with network graph modifications. Utilizing previous user actions to implicitly guide underlying algorithms, the interactive graphing system can iteratively influence future edits and/or processing results (e.g., outputs from graph-based models). For example, the interactive graphing system provides accurate recommended actions or graph updates that are based, in part, on user intent ascertained from the previous user actions (e.g., a user action log). Indeed, the interactive graphing system can utilize the previous user actions as prior information to serve downstream queries, models, and explorations more accurately. Further, the interactive graphing system can improve computing efficiency by running graph-based models and other operations on smaller local subgraphs of the network device determined based on previous user actions.

In various implementations, the interactive graphing system provides improved flexibility by facilitating user sessions and network graph versioning. For instance, in various implementations, the interactive graphing system facilitates users to create different sessions to test how different network graph edits trigger different recommendations and insights in the interactive graphing system. Additionally, in some implementations, the interactive graphing system allows for a user or multiple users to combine different instances of the same network graph.

In addition, the interactive graphing system can perform network graph modifications and updates in real time. For example, in various implementations, the interactive graphing system utilizes current graph modifications and the previous actions to quickly generate further graph updates to a network graph as a probabilistic model and/or provide recommended network graph outputs.

To elaborate, in one or more implementations, the interactive graphing system facilitates editing multiple network graphs into a combined network graph. For example, the interactive graphing system facilitates connecting separate network graphs directly or via one or more intermediary nodes. Once generated, the interactive graphing system can determine and suggests additional graph updates and insights that are influenced, at least in part, by implicit user actions. For instance, based on processing the combined network graph as a whole, the interactive graphing system can recommend connecting nodes for the separate network graphs and/or adding or removing nodes.

As illustrated in the foregoing discussion, the present disclosure utilizes a variety of terms to describe the features and advantages of one or more implementations described herein. For instance, the term network graph refers to a data structure that indicates relationships between elements. For example, a network graph includes network nodes (i.e., elements) connected by network edges (or simply edges) that represent how the network nodes (or simply nodes) interconnect. Examples of network graphs include knowledge graphs, multiplex graphs, heterogeneous graphs, hypergraphs, directed graphs, and/or undirected graphs. In many implementations, a network graph can be represented visually, such as within an interactive interface. In some implementations, a network graph is maintained with a database or other storage medium as interconnected elements.

As used herein, the term "graph-based model" refers to an algorithm that utilizes a network graph as input and outputs one or more augmentations or modifications to the network graph and/or new insights and information. In various implementations, graph-based models also generate output based on user actions and/or user profile information. A graph-based model can be a machine-learning model, neural network, rule-based model, or another type of model. In example implementations, a graph-based model performs a survey, exploration, path connectivity, group connectivity, or another type of function. Examples of graph-based models include new node prediction models, path-based link prediction models, node clustering models, or node classification models.

In various implementations, the term "node characteristic" (or simply "characteristic") refers to an attribute, trait, or feature of a network node. For example, a node characteristic may indicate an identifier of an object or qualities of the object. Additionally, nodes in a network graph may be connected by network edges based on shared node characteristics. For example, if two adjacent nodes in a network graph share a characteristic, the nodes can be connected within the network graph. In some instances, two nodes sharing multiple characteristics are connected with multiple edges. In some implementations, nodes in a network graph are connected when their characteristics satisfy a minimum connection threshold. In various implementations, nodes in a network graph are connected when they have complementary characteristics (e.g., Node A is a subset of Node ABC).

As used herein, the term "machine learning" refers to algorithms that generate data-driven predictions or decisions from the known input data. Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), multi-arm bandits models, linear regression models, logistical regression models, random forest models, support vector machines (SVG) models, neural networks (convolutional neural networks, recurrent neural networks such as LSTMs, graph neural networks, etc.), or decision tree models.

Figure 1B:
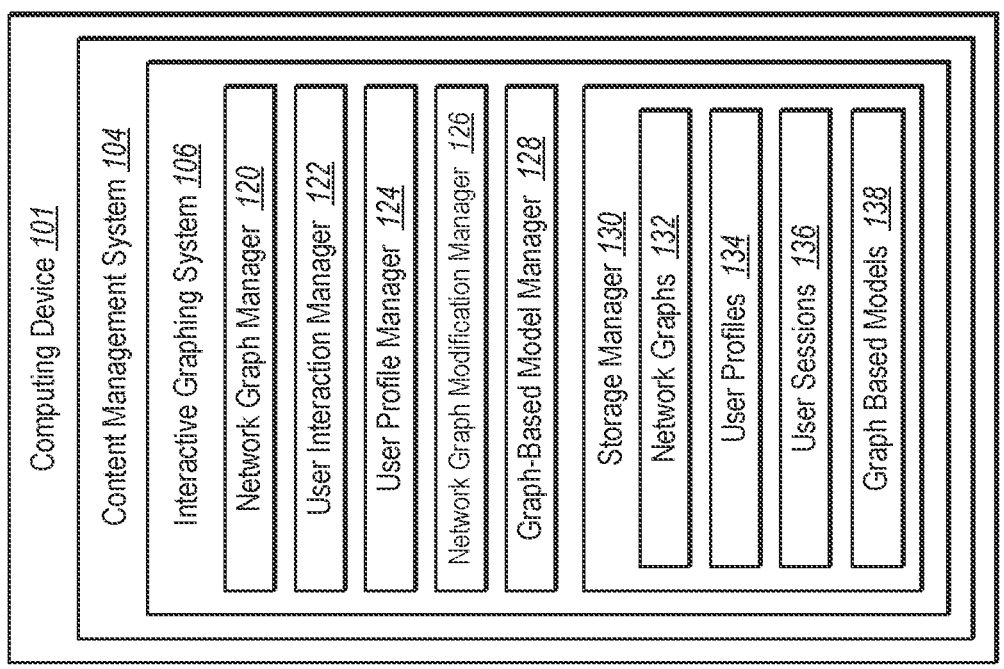

Additional detail is now be provided regarding the components and elements of the interactive graphing system. For example, FIGS. 1A-1B illustrate a schematic diagram of an environment 100 (i.e., a digital medium system environment) for implementing an interactive graphing system 106. In particular, FIG. 1A includes the environment 100 and FIG. 1B provides additional detail regarding components and elements of the interactive graphing system 106.

As shown in FIG. 1A, the environment 100 includes a client device 102, a server device 108, and a network device 112, which can communicate via a network 116. Additional detail regarding these and other computing devices is provided below in connection with FIG. 9. In addition, FIG. 9 also provides additional detail regarding networks, such as the network 116 shown.

In various implementations, the client device 102 is associated with a user (e.g., a user client device), such as a user that interacts with the interactive graphing system 106 to request a network graph. As shown, the client device 102 includes a content management system 104. In various implementations, the content management system 104 can perform a variety of functions. For example, in one or more implementations, the content management system 104 facilitates the distribution of various digital content across the network 116. In various implementations, the content management system 104 facilitates, identifies, receives, accesses, opens, loads, edits, modifies, moves, copies, shares, saves, removes, deletes, stores, downloads, transmits, and/or imports digital content.

As also shown, the content management system 104 includes an interactive graphing system 106. In various implementations, the interactive graphing system 106 generates network graphs from one or more graph data sources. For example, the interactive graphing system 106 generates a network graph from a graph source data 114 stored on the network device 112. Additionally, as described below, the interactive graphing system 106 can further modify and/or recommend augmentations to a generated network graph based on implicit user data based on prior user actions. Additional details and components of the interactive graphing system 106 are provided in FIG. 1B.

As just mentioned, the network device 112 includes the graph source data 114. In one or more implementations, the graph source data 114 can generate, create, receive, obtain, encode, modify, store, transmit, share, or otherwise manage digital content. For example, the graph source data 114 maintains document collections that include research data or one or more databases of relevant data. In various implementations, the graph source data 114 is located across multiple network devices and/or network locations.

As shown, the environment 100 also includes the server device 108. The server device 108 includes an interactive graphing server system 110. For example, in one or more implementations, the interactive graphing server system 110 represents and/or provides similar functionality as described herein in connection with the interactive graphing system 106. In some implementations, the interactive graphing server system 110 supports the interactive graphing system 106 on the client device 102. Indeed, in one or more implementations, the server device 108 includes all, or a portion of, the interactive graphing system 106. For instance, the interactive graphing system 106 on the client device 102 downloads and/or accesses an application from the server device 108 (e.g., that provides an interactive interface to utilize the graph source data represented as a network graph) or a portion of a software application.

In some implementations, the interactive graphing server system 110 includes a web hosting application that allows the client device 102 to interact with content and services hosted on the server device 108. To illustrate, in one or more implementations, the interactive graphing server system 110 implements the network graphing framework and/or includes one or more graph-based models. For example, the client device 102 (e.g., a mobile device) provides an interactive interface for modifying and visualizing network graphs while the interactive graphing server system 110 on the server device 108 provides back-end processing.

Although FIG. 1A illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 116 or utilizing a separate and/or an additional network.

As mentioned above, FIG. 1B provides additional detail regarding the capabilities and components of the interactive graphing system 106. To illustrate, FIG. 1B shows a computing device 101 having the content management system 104 and the interactive graphing system 106. For example, the computing device 101 represents either the client device 102 and/or the server device 108 introduced above.

In addition, as shown, the interactive graphing system 106 includes various components and elements. For example, the interactive graphing system 106 includes a network graph manager 120, a user interaction manager 122, a user profile manager 124, a network graph modification manager 126, a graph-based model manager 128, and a storage manager 130. As also shown, the storage manager 130 can include network graphs 132, user profiles 134, user sessions 136, and graph-based models 138.

As shown, the interactive graphing system 106 includes the network graph manager 120. In one or more implementations, the network graph manager 120 receives, accesses, provides, edits, modifies, identifies, creates, or otherwise manages the network graphs 132. For example, the network graph manager 120 accesses graph source data to generate an initial network graph. In various implementations, the network graph manager 120 can interact with other network graph managers corresponding to different users and/or computing devices (e.g., to combine different instances or sessions of network graphs together).

As shown, the interactive graphing system 106 includes the user interaction manager 122. In various implementations, the user interaction manager 122 facilitates identifying, detecting, storing, accessing, or otherwise managing user actions with respect to the network graphs 132. In various implementations, the user interaction manager 122 detects user input with respect to performing a modification of a network graph and/or executing a graph-based model on a network graph.

As also shown, the interactive graphing system 106 includes the user profile manager 124. In various implementations, the user profile manager 124 generates, identifies, edits, modifies, receives, logs, curates, analyzes, accesses, provides, or otherwise manages user profiles 134. For example, the user profile manager 124 builds a user profile for a target user that includes actions between the target user and one or more network graphs. In various implementations, the user profile manager 124 can include user action attributes, such as when and to which network graph a modification was made.

As shown, the interactive graphing system 106 includes the network graph modification manager 126. In various implementations, the network graph modification manager 126 generates modified and/or updated network graphs. For example, the network graph modification manager 126 can generate a new version of a network graph based on detected user input as well as further new versions of the network graph based on recommendations of the interactive graphing system 106. In various implementations, the graph modification manager 126 generates various user sessions 136 to facilitate one or more users making temporary changes to a source network graph.

In some implementations, the network graph modification manager 126 communicates with other managers to generate dynamic and/or suggested versions of a network graph. For example, the network graph modification manager 126 utilizes the graph-based model manager 128 to process a suggested network graph to provide further recommendations to include in an automatically updated network graph.

As also shown, the interactive graphing system 106 includes the graph-based model manager 128. In various implementations, the graph-based model manager 128 accesses, provides, executes, runs, generates, identifies, edits, modifies, receives, or otherwise manages graph-based models 138. For example, in one or more implementations, the graph-based model manager 128 utilizes graph-based models 138 along with user information from the user profiles 134 to determine recommendations to include in an updated network graph.

Additionally, the interactive graphing system 106 includes the storage manager 130. In various implementations, the storage manager 130 can include any data used by any of the components of the interactive graphing system 106 in performing features and functionality described herein. As shown, the storage manager 130 may include the network graphs 132, user profiles 134, user sessions 136, and graph-based models 138.

Figure 2:
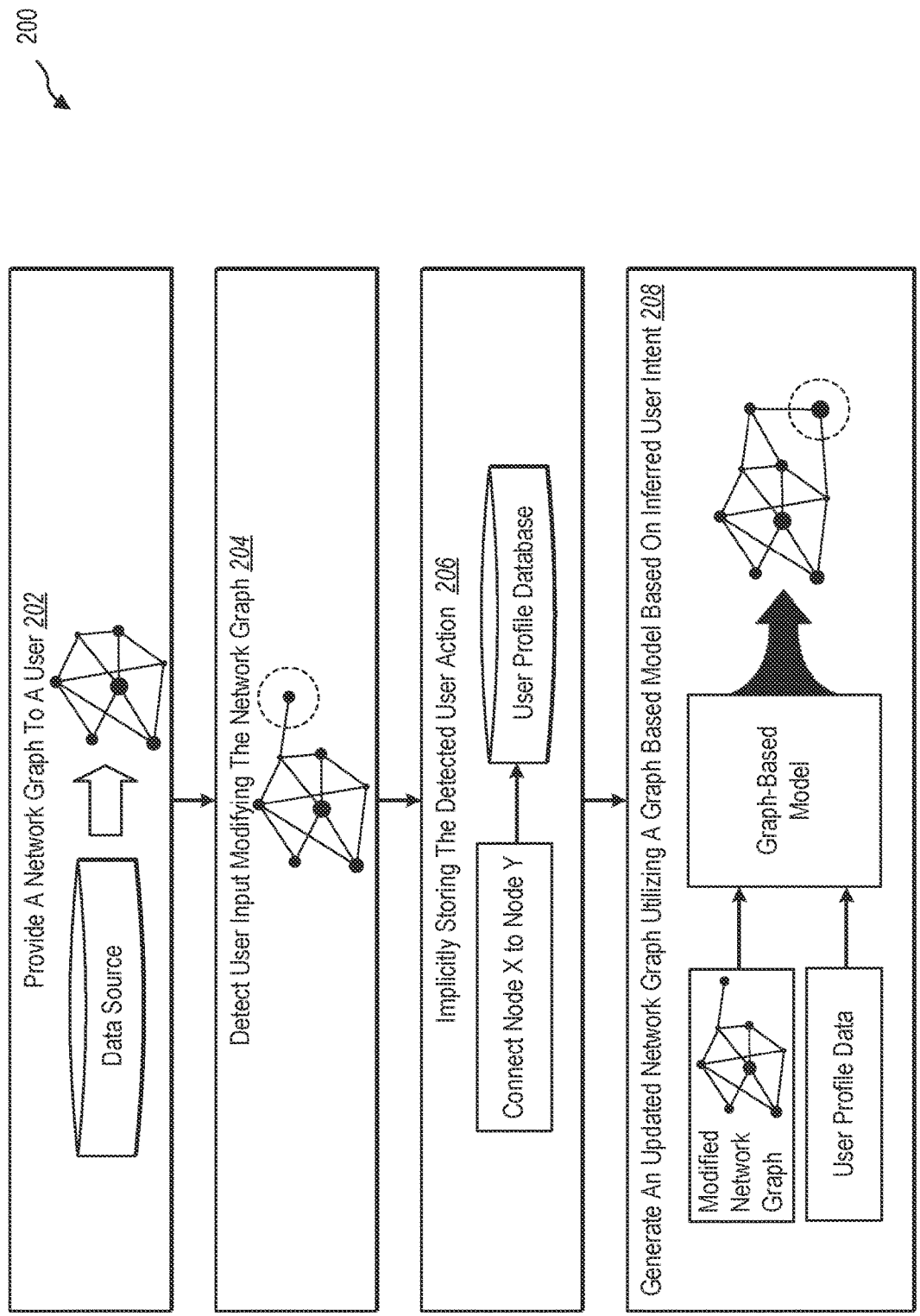
FIG. 2 illustrates an example workflow for generating and providing an automatically updated network graph based on user actions in accordance with one or more implementations.

Additional detail in connection with an example implementation of the interactive graphing system 106 is discussed in connection with FIG. 2. For example, FIG. 2 illustrates an example workflow for generating and providing an automatically updated network graph based on user actions in accordance with one or more implementations. As shown, FIG. 2 illustrates a series of acts 200, which can be performed by the interactive graphing system 106 and/or a content management system.

As shown in FIG. 2, the series of acts 200 includes an act 202 of providing a network graph to a user. For instance, in various implementations, the interactive graphing system 106 accesses graph source data from a data source and generates a network graph that includes nodes connected by edges. For example, the nodes represent prescription drugs and the edges indicate the side effects of taking two drugs together (e.g., a drug-drug network graph). As noted above, the network graph can include several graph types.

As shown in FIG. 2, the series of acts 200 includes an act 204 of detecting user input modifying the network graph. In one or more implementations, the interactive graphing system 106 provides a user with an interactive interface that offers several actions. For example, the interactive graphing system 106 facilitates adding edges, removing nodes, changing the connection strength between nodes, focusing on sub-areas of the network graph, or running a variety of graph-based models. For instance, with the above example of the drug-drug network graph, the interactive graphing system 106 can detect the user adding one or more connections between drug nodes. Indeed, with each user action, the interactive graphing system 106 can monitor and detect the action as well as the current state of the network graph. Additional detail regarding detecting user input modifying a network graph is provided below in connection with FIG. 3, FIG. 5A, FIG. 6A, and FIG. 7A.

As shown in FIG. 2, the series of acts 200 includes an act 206 of implicitly storing the detected user action. For instance, in various implementations, the interactive graphing system 106 stores the detected user actions as part of a user profile associated with the user. In this manner, the interactive graphing system 106 can gather a collection of implicit user data that corresponds to the actions, intents, and preferences of the user as they interact with network graphs. Additional detail with respect to gathering user action data is provided below in connection with FIG. 3.

As shown in FIG. 2, the series of acts 200 includes an act 208 of generating an updated network graph utilizing a graph-based model based on inferred user intent. For example, in various implementations, the interactive graphing system 106 utilizes the user-modified network graph and user profile data as input to one or more graph-based models to generate an updated network graph. In one or more implementations, the interactive graphing system 106 provides the inputs to multiple graph-based models to determine anticipated modifications to the network graph.

For instance, with the above example of the drug-drug network graph, based on detecting a user removing a link (e.g., an edge), the interactive graphing system 106 determines to automatically remove additional similar links. More specifically, the interactive graphing system 106 utilizes characteristics and attributes of the removed link, the current network graph, and a link prediction model to determine one or more other similar links to also remove. The interactive graphing system 106 then removes these links and provides the updated network graph to the user. Additional detail regarding generating an updated network graph is provided below in connection with FIG. 3, FIG. 5B, FIGS. 6B-6C, and FIG. 7B.

As mentioned above, FIG. 3 provides additional details with respect to gathering user data and generating updated network graphs. As illustrated, FIG. 3 shows a block diagram for generating an updated network graph based on user actions in accordance with one or more implementations.

Figure 3:
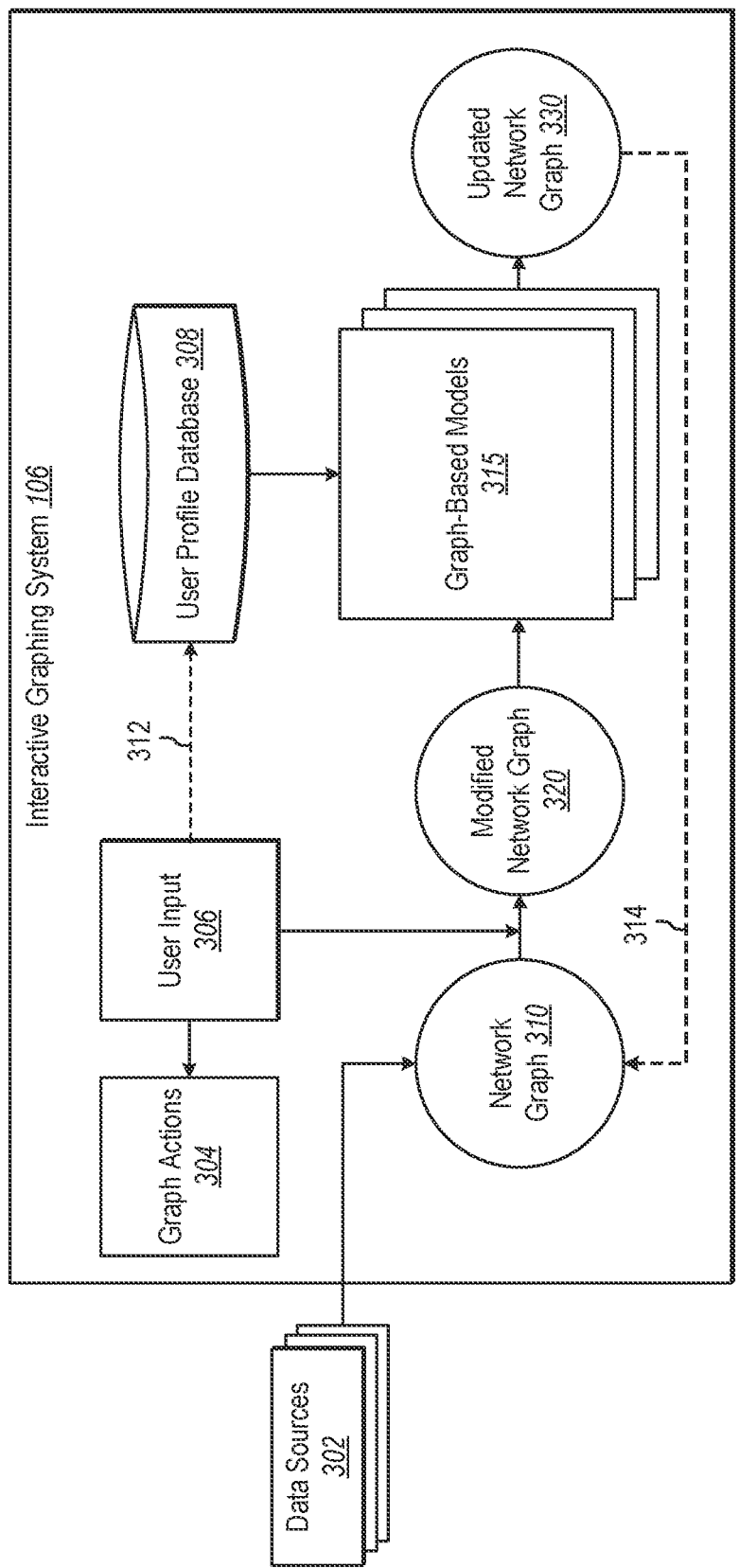
FIG. 3 illustrates a block diagram that includes additional details for generating an updated network graph based on user actions in accordance with one or more implementations.

As shown, FIG. 3 includes data sources 302 and the interactive graphing system 106. As also shown, the interactive graphing system 106 includes graph actions 304 connected to user input 306, a user profile database 308, and graph-based models 315 as well as various network graphs, which include a network graph 310, a modified network graph 320, and an updated network graph 330. In various implementations, one or more of the components shown in the interactive graphing system 106 are located elsewhere, including on the same or a different computing device. For example, in various implementations, the data sources 302 are scattered across sources and/or not in a uniform format.

In various implementations, the interactive graphing system 106 accesses data from the data sources 302 (e.g., a graph dataset or another dataset) to generate a network graph 310 to provide to a user (e.g., an initial network graph). In some implementations, upon generating the network graph 310, the interactive graphing system 106 provides the network graph 310 within an interactive interface, such as the interactive interface described below in connection with FIG. 4. In some implementations, the interactive graphing system 106 previously generates the network graph 310 as a source graph (e.g., a base or reference graph) and provides a copy of the source graph to a user.

In various implementations, the interactive graphing system 106 generates user sessions in connection with providing the network graph 310 to a user. For example, in connection with providing the user with a copy of the source graph (e.g., the network graph 310), the interactive graphing system 106 creates a session where the user is free to modify the network graph 310. Further, the interactive graphing system 106 enables a user to create multiple sessions and explore the effects of different modifications on the network graph 310 as well as how the interactive graphing system 106 can further modify the network graph based on detected user actions.

In some implementations, the interactive graphing system 106 allows users to save, branch, and load previous sessions. In various instances, the interactive graphing system 106 facilitates sharing sessions (e.g., session data) between users. Further, in one or more implementations, the interactive graphing system 106 provides tools for combining network graphs from different sessions of the same user or across users. In this manner, the interactive graphing system 106 facilitates dataset exploration through network graph interactions while allowing the source data to remain unchanged. Additionally, in some implementations, the interactive graphing system 106 facilitates updating the source data based on changes made to a network graph.

In various implementations, the interactive graphing system 106 presents a focused or zoomed-in version of a network graph to a user. For example, the interactive graphing system 106 displays a network graph that only includes a subset of the data source. In some instances, the interactive graphing system 106 displays a smaller network graph based on a user request (e.g., the user requests to shirk or expand the size of a network graph). For instance, the interactive graphing system 106 receives a request to display a select number of nodes. In other instances, the interactive graphing system 106 determines to show a smaller network graph inferred from user actions. For instance, the interactive graphing system 106 focuses on a particular set of nodes based on previous user interactions with the network graph. By focusing on a smaller local subgraph, the interactive graphing system 106 can increase efficiency by processing smaller amounts of data (e.g., limited to the displayed nodes) utilizing the graph-based models.

In one or more implementations, the interactive graphing system 106 generates a first network graph from one data source and a second network graph from another data source. In some implementations, the interactive graphing system 106 facilitates user input to connect the first network graph and the second network graph together despite them being separate network graphs and/or being from different data sources.

As shown, the interactive graphing system 106 can generate a modified network graph 320 based on user input 306 with respect to graph actions 304. For example, the interactive graphing system 106 provides several graph actions 304 that facilitate graph editing and processing. For example, the interactive graphing system 106 allows a user to survey, update, or reset a network graph. In addition, the graph actions 304 make a suite of graph-based models available to a user. Additional detail regarding graph actions 304 is provided below in connection with FIG. 4.

As also shown, the interactive graphing system 106 can detect the user input 306 with respect to the graph actions 304 and modify the network graph 310 to generate a modified network graph 320. In some implementations, the graph actions 304 includes an indication of user interaction with nodes or connections (i.e., edges) in the network graph 310. For example, the interactive graphing system 106 determines selections, clicks, mouse hover times, or dwell times per node or per area (e.g., a graph subset), which can be used to create a user-specific interest ranking. In some implementations, interactive graphing system 106 infers one or more graph actions by an implicit user input (e.g., a user downvotes a node with Characteristic A, so the interactive graphing system 106 performs a graph action of removing other nodes with Characteristic A).

In addition, the interactive graphing system 106 can capture and store the user input 306 (shown as the dashed arrow 312) in a user profile database 308. In some implementations, the user profile database 308 maintains a log of user actions, where the user actions form a set of priors used to generate a user profile. In certain implementations, the user profile database 308 stores a copy (or a portion thereof) of the network graph in connection with the detected user action. In example implementations, the interactive graphing system 106 captures the user's action implicitly and/or indirectly. In various instances, the interactive graph in system 106 receives authorization from the user to implicitly collect the user input 306 while the user is interacting with the network graph 310.

As mentioned above, in various implementations, the interactive graphing system 106 stores the user input 306 within the user profile database 308. For example, the interacting graphing system 106 adds the user input 306 a user profile associated with the user. In some implementations, user profile data is tagged or otherwise associated with a specific network graph, a specific instance of a network graph, a specific data source, or a specific dataset. For example, the interactive graphing system 106 can apply one set of graph-specific updates to graphs associated with a first dataset and a second set of graph-specific updates for network graphs associated with a second, different dataset based on the different sub-profiles stored for the user. Indeed, the interactive graphing system 106 can infer a first intent of a user when providing recommendations for a first network graph and infer a second different intent for the user when providing recommendations for a second network graph. In some implementations, the interactive graphing system 106 analyzes a user's actions across multiple network graphs to infer user intent.

As shown, the interactive graphing system 106 generates the updated network graph 330 utilizing graph-based models 315, which can be influenced by user profile data 308. More specifically, in one or more implementations, the interactive graphing system 106 runs one or more graph-based models 315 on the modified network graph 320 to generate the updated network graph 330. In additional implementations, the interactive graphing system 106 can utilize the user profile data 308 to determine which graph based-models 315 to run or the portions of the modified network graph 320 to modify based on user intent determined from the user's previous actions.

To further illustrate, the interactive graphing system 106 can select one of the graph-based models 315 that corresponds with a recent user action. For example, if the recent user action corresponds to removing nodes or connections, the interactive graphing system 106 can select one or more of the graph-based models 315 that correspond to detecting additional nodes or connections to be removed to generate the updated network graph 330. Indeed, in various implementations, the interactive graphing system 106 can augment or append the modified network graph 320 to generate the updated network graph 330 based on the output and/or results from the graph-based models 315.

In some implementations, the interactive graphing system 106 can select which of the graph-based models 315 to run based on which models have been previously executed. For instance, if the interactive graphing system has previously run a path-based link prediction model, after one or more detected user modifications to a network graph, the interactive graphing system 106 can again run the path-based link prediction model. In additional implementations, the interactive graphing system 106 can narrow the focus of the path-based link prediction model to areas of the modified network graph 320 that correspond to the recent detected user action. In this manner, the interactive graphing system 106 can use implicit user input to determine user intent to update network graphs as well as more efficiently run graph-based models 315 on the network graphs.

As shown by arrow 314 in FIG. 3, the interactive graphing system 106 can repeat the process of presenting a network graph, receiving user modifications, and updating the network graph based on inferred user intent. Indeed, the interactive graphing system 106 can continually receive user input (e.g., both positive- and negative-based feedback) and provide further inferred modifications to the network graph. In this manner, the interactive graphing system 106 can interplay with the user with respect to both graph edits and graph-based models to provide them with valuable and unanticipated suggestions regarding the network graph.

As mentioned above, the interactive graphical system 106 can utilize implicit user feedback to generate estimated updates on the network graph. In one or more implementations, the interactive graphing system 106 can also learn from explicit feedback. For example, upon generating the updated network graph 330, the interactive graphing system 106 can detect additional user input. If the input is positive, such as confirming a suggested change or building on recommended nodes or connections, the interactive graphing system 106 can utilize the positive feedback to make similar updates in the future. If, on the other hand, the input is negative, such as undoing or rejecting a suggested change, then the interactive graphing system 106 can learn to not apply similar updates in the future.

In various implementations, the interactive graphing system 106 can indicate where recommendations have been made in the updated network graph 330. For example, the interactive graphing system 106 can colorize or otherwise emphasize changes or suggestions included in the updated network graph 330. In some implementations, the interactive graphing system 106 may provide reasoning or an explanation as to why a particular recommendation was given. For instance, upon detecting the selection of a newly added connection, the interactive graphical system 106 can provide a popup indicating that due to one or more recent changes in the network graph, the connection strength between the corresponding nodes now satisfies a relationship threshold.

As noted above, the interactive graphing system 106 can facilitate the use of a network graph by multiple users. For example, a team of users can provide separate individual changes to a network graph 310 and, in response, the interactive graphing system 106 can generate different versions of the updated network graph 330. The interactive graphing system 106 facilitates sharing the different updated network graphs among team members, collaborating on the different graphs, comparing the different graphs, or combining (e.g., averaging, merging, etc.) the modified graphs together.

While the current disclosure corresponds to generating network graphs, in many implementations, the interactive graphing systems 106 can utilize the same principles and approaches for non-graph and/or non-visual scenarios. For example, the interactive graphing system 106 can be applied to a recommendation system to recommend content based on implicit user feedback and interaction with other content. Indeed, the interactive graphing system 106 can apply the techniques disclosed herein on the back end of various graph-based systems.

Figure 4:
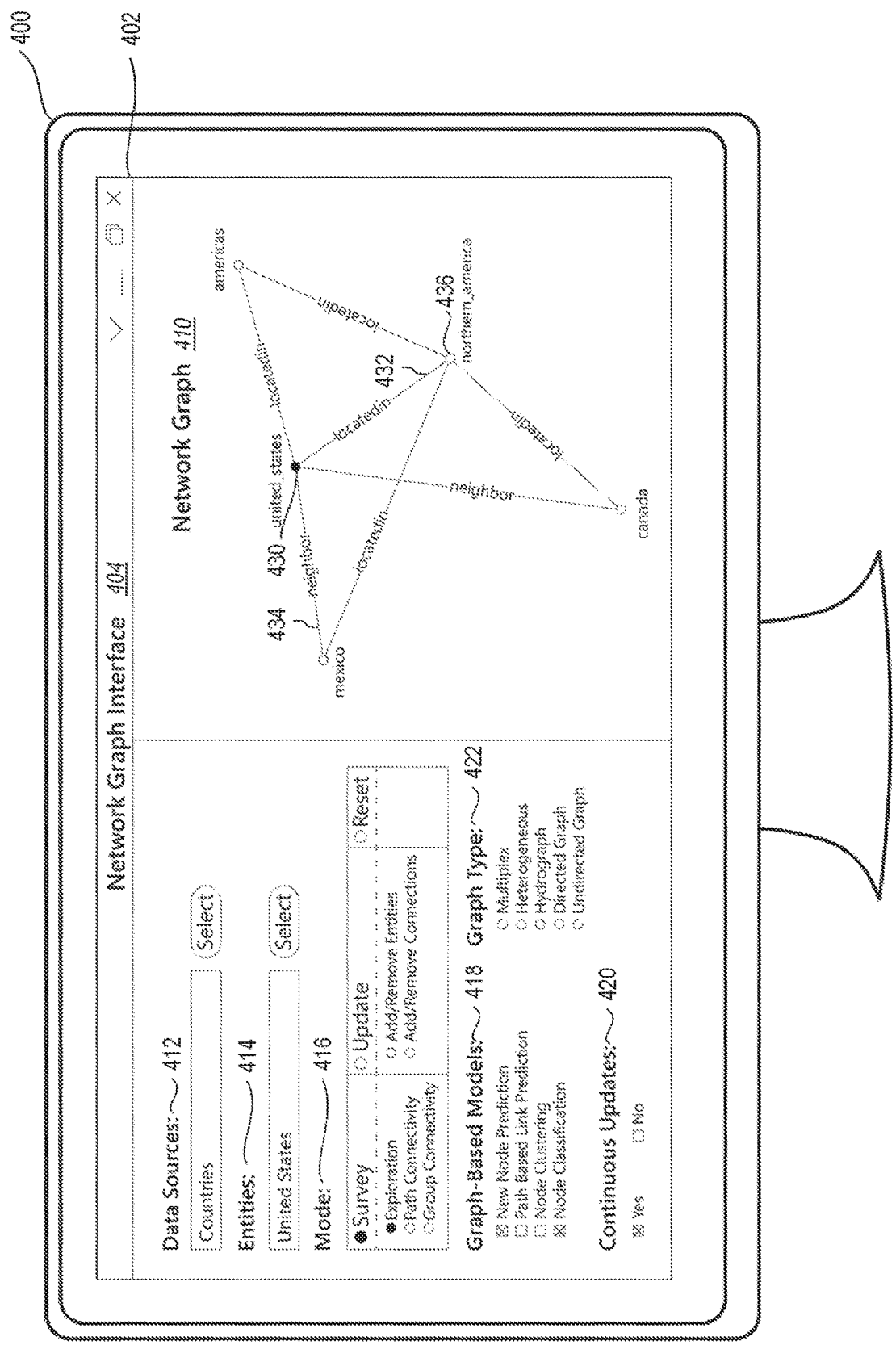
FIG. 4 illustrates an interactive interface for providing a network graph in accordance with one or more implementations.

As mentioned above, FIG. 4 provides additional detail regarding providing an interactive interface to a user to facilitate interplaying with network graphs. In particular, FIG. 4 illustrates an interactive interface for providing a network graph in accordance with one or more implementations. In particular, FIG. 4 includes a computing device 400 having a graphical user interface 402 for displaying a network graph interface 404. In various implementations, the computing device 400 represents that client device 102 and/or the server device 108 introduced above.

As shown, the network graph interface 404 is an interactive interface that includes various interactive elements and options for requesting, modifying, and viewing a network graph. In particular, the network graph interface 404 includes various selectable elements including a data sources element 412, an entities element 414, a mode element 416, a graph-based models element 418, a continuous updates element 420, and a graph type element 422. Additionally, the network graph interface 404 includes a network graph 410 having nodes and connections (e.g., lines).

As shown, the network graph interface 404 includes the data sources element 412. In various implementations, the data sources element 412 allows a user to select one or more datasets or data from which to generate a network graph. In various implementations, the interactive graphing system 106 enables a user to select and/or access multiple data sources. Additionally, the interactive graphing system 106 enables the selection of both local and remote data sources.

In some implementations, the data sources element 412 enables the selection of a previously generated network graph. For example, upon selection of the data sources element 412, the interactive graphing system 106 provides the user with a list of network graphs from which to select. In one or more implementations, the interactive graphing system 106 enables a user to select a previously saved session via the data sources element 412.

As shown, the network graph interface 404 includes the entities element 414. In various implementations, the interactive graphing system 106 enables a user to select one or more entities from the data source. In various implementations, the interactive graphing system 106 includes and/or focuses the network graph 410 based on the selected entities. In one or more implementations, the number and/or type of entities needing to be selected is based on the selected mode. For example, a first mode may require selecting at least a single entity (e.g., the survey mode) while a second mode may require at least two entities to be selected (e.g., adding connections in the update mode). In some cases, the selected mode may not require any entities to be selected, such as the reset mode.

As shown, the network graph interface 404 includes the mode element 416. In one or more implementations, the interactive graphing system 106 enables the selection of a graph mode for making edits to the network graph 410. For example, the mode element 416 includes a survey mode, update mode, and a reset mode. Other modes are possible as well.

As also shown, the survey mode includes an exploration option, a path connectivity option, and a group connectivity option. For instance, the exploration option corresponds to a network graph that shows a selected entity along with its connections. In this manner, the exploration option allows a user to explore the connections of a selected entity. Additionally, the path connectivity option can display the connections between selected entities. In some instances, the path connectivity option can also indicate or report an influence score between connected entities. Further, the Group connectivity option can display a network graph showing the connections between all entities based on the selected entities.

With respect to the update mode, as shown, the update mode includes an add/remove entities option and an add/remove connection option. In some instances, the add/remove entities option allows a user to add one or more nodes or remove one or more nodes from the network graft 410. Likewise, the add/remove connections option allows a user to add an edge (e.g., a connection) between two selected entities or remove an edge between entities. In some implementations, when adding a connection, the interactive graphing system 106 enables the user to specify a weight or connection strength between the selected entities. In other implementations, the interactive system 106 utilizes a default connection strength value (e.g., 0.5 or 1.0 out of 1.0).

As shown, the mode element 416 can include the reset element. In various implementations, the reset element resets a modified or updated network graph to its original state. In this manner, the interactive graphing system 106 can enable a user to make various exploratory modifications to reveal new relationships and information from updated network graphs while also easily allowing the user to undo changes, start over, or start a new session with a fresh version of the network graph. Similarly, the mode element 416 can include a save secession element as well as a restore session element.

As noted above, the network graph interface 404 includes the graph-based models element 418. In various implementations, the interactive graphing system 106 provides several graph-based models to run on the network graph 410. Indeed, the network graph interface 404 includes various example graph-based models, which will be discussed below. In alternative implementations, the graph-based models element 418 displays additional, or different graph-based models. Indeed, the graph-based models element 418 can include a suite of various graph-based models.

In various implementations, the new node prediction model is a graph-based model that identifies additional notes to be added to the network graph 410. In addition, when provided with user input data, the new node prediction model can focus new node predictions on a particular area or subset of the network graph 410. As another example, the new node prediction model may utilize user input data to identify a new node to add to the network graph 410 that is similar to other nodes with which the user has been interacting. For example, if the nodes represent colors and the user is interacting with and/or modifying the blue and yellow nodes, the new prediction model can recommend adding a green node.

In one or more implementations, the path-based link prediction model is a graph-based model that predicts missing connections, links, or edges between nodes. For example, the path-based link prediction model can generate influence scores between notes and add a connection or link when the influence score satisfies a connection threshold (e.g., is above a threshold number). Further, the influence score between two nodes may be based on other surrounding nodes in a network graph and the relationship between the two nodes and the other surrounding nodes.

In some implementations, the path-based link prediction model determines an influence score for link prediction utilizing the formulation of $$\text{score} = \frac{1}{L} \sum_{i \in Path} (w_i \times \gamma^i),$$

where $\gamma \in (0, 1)$, weight $w_i \in (0, 1]$, and L represents a length path (i.e., length(Path)). Indeed, in various implementations, the path-based link prediction model calculates an influence score based on different paths from one node to another. When the influence score meets a link threshold, the interactive graphing system 106 can suggest adding a missing link between the two nodes. Accordingly, adding or removing nodes along the path can cause the influence score to increase or decrease. Additionally, in various implementations, the path-based link prediction model may be further influenced by user profile data, as noted above.

In example implementations, the node clustering model is a graph-based model that identifies potential node clusters within a network graph. For instance, the node clustering model emphasizes a group of nodes having similar relationships or that are predicted to have similar relationships. For example, a node clustering model may reveal clusters of nodes that are related but otherwise difficult to see visually, such as in a hypernode graph where two nodes can have multiple edges interconnecting the two nodes.

In certain implementations, the node classification model is a graph-based model that classifies (or reclassifies) nodes of a network graph. For example, as user inputs are received to modify a network graph, the node classification model may determine to reclassify one or more nodes with which the user interacts, similar nodes in the network graph, or nodes that are within the same area. In some implementations, the node classification model can also classify (e.g., label) or reclassify edges between nodes.

In various implementations, the graph-based models are machine-learning models and/or neural networks. In some implementations, the interactive graphing system 106 can utilize different versions of the same type of model, such as a link prediction neural network and a link prediction heuristic model or two different versions of edge prediction neural networks.

As shown, the network graph interface 404 includes the continuous updates element 420. In various implementations, the interactive graphing system 106 facilitates the ability to run multiple iterations of the graph-based models. For example, each time a user modification to the network graph 410 is detected, the interactive graphing system 106 can re-run one or more of the graph-based models. Likewise, each time the interactive graphing system 106 updates the network graph 410, the interactive graphing system 106 can re-run one or more of the graph-based models. For instance, the output of one model may then change the output of another graph-based model (e.g., the new node model adds a new node and the path-based link prediction model adds one or more additional connections between the new node and existing nodes). Additionally, the interactive graphing system 106 can execute multiple graph-based models at the same time, which facilitates very efficient graph exploration.

Additionally, in many implementations, the interactive graphing system 106 can efficiently run one or more of the graph-based models on-the-fly quickly and/or in real time. In this manner, as a user is modifying a network graph, the interactive graphing system 106 is providing real-time suggestions, feedback, and information to the user.

As shown, the network graph interface 404 includes the graph type element 422. The graph types illustrated with the graph type element 422 represent example graph types that the interactive graphing system 106 can process and display. As shown, the graph types include a multiplex network graph, a heterogeneous network graph, a hypergraph (e.g., hypernode) network graph, a directed network graph, and a undirected network graph. Indeed, the interactive graphing system 106 can accommodate a variety of graph types and styles that range from nodes having single connections in a particular direction (e.g., Node A belongs to Node B) to two nodes having multiple connections in both directions (e.g., Node A and Node B share five characteristics in common resulting in five non-directional links) a node having one or more connections with itself.

In various implementations, the network graph interface 404 includes an iteration state variable, which may be hidden or visible. For example, depending on the type of graphical user interface that the interactive graphing system 106 provides, the inputs may include and/or require an iteration state variable (e.g., in the case that the inputs are provided in a query string). In various implementations, the iteration state variable may enable the interactive graphing system 106 to build on the same network graph. In some implementations, the iteration state variable is a session variable that ties a network graph to a session and allows the network graph to evolve over the session. In certain implementations, the iteration state variable is inherent and not required or is hidden from a user's view.

As shown, the network graph interface 404 includes the network graph 410 having nodes and edges. As shown, the nodes correspond to countries in North America. For example, some nodes are countries (e.g., united states node 430) while other nodes represent geographical regions (e.g., northern America node 436). As also shown, the edges correspond to relationships between the nodes and include a first relationship type 432 (i.e., "located in") and a second relationship type 434 (i.e., "neighbor"). Additional types of nodes and edges are also possible.

As shown, country nodes are connected to each other as neighbors. Additionally, region nodes connect to corresponding country nodes when the corresponding country is located in the corresponding geographical region. Additionally, as shown, the northern America node 436, which is a region node, is located within a larger region node called "Americas."

Additionally, in various implementations, the network graph 410 includes different edge styles. For example, for edges, the network graph 410 can include colored-coded, patterned, weighted, or otherwise delineated styles to distinguish between connection types, connection strengths, influence scores, etc. For instance, an edge with a stronger influence score has a thicker weight than one with a lower influence score. Similarly, the interactive graphing system 106 can display various node styles, such as showing enlarging a node based on its importance or influence (e.g., node size can represent the relevance and/or importance of nodes in a network graph).

In various implementations, the interactive graphing system 106 can update the network graph 410 in real time to reflect user modifications as well as updates by the interactive graphing system 106. In this manner, the interactive graphing system 106 facilitates user interaction and interplay as both the user and the interactive graphing system 106 apply and display changes to the network graph 410. Additional examples of network graphs dynamically updating based on user modifications are provided below in connection with FIGS. 5A-5B, FIGS. 6A-6C, and FIGS. 7A-7B.

In some implementations, the network graph interface 404 facilitates directly editing the network graph 410. For example, the interactive graphing system 106 enables the user to directly add or remove nodes or connections with respect to the network graph 410. As another example, the interactive graphing system 106 facilitates selecting a node or connection and providing instructions to run a particular graph-based model. In one or more implementations, the network graph interface 104 may provide different menu options, selectable elements, and/or tools to facilitate editing the network graph 410.

Turning now to FIGS. 5A-5B, FIGS. 6A-6C, and FIGS. 7A-7B, examples are provided showing the interactive graphing system 106 updating network graphs in response to user action. Each of these figures includes a data source 512, entities 514, the mode 516, and a network graph (which can correspond to the data sources element 412), the entities element 414, the mode element 416, and the network graph 410 provided above in connection with FIG. 4. Indeed, the elements and network graphs shown in these figures can correspond to an interactive interface, such as the network graph interface 404 described above or another type of interface (e.g., a command line-type interface).

Figure 5A:
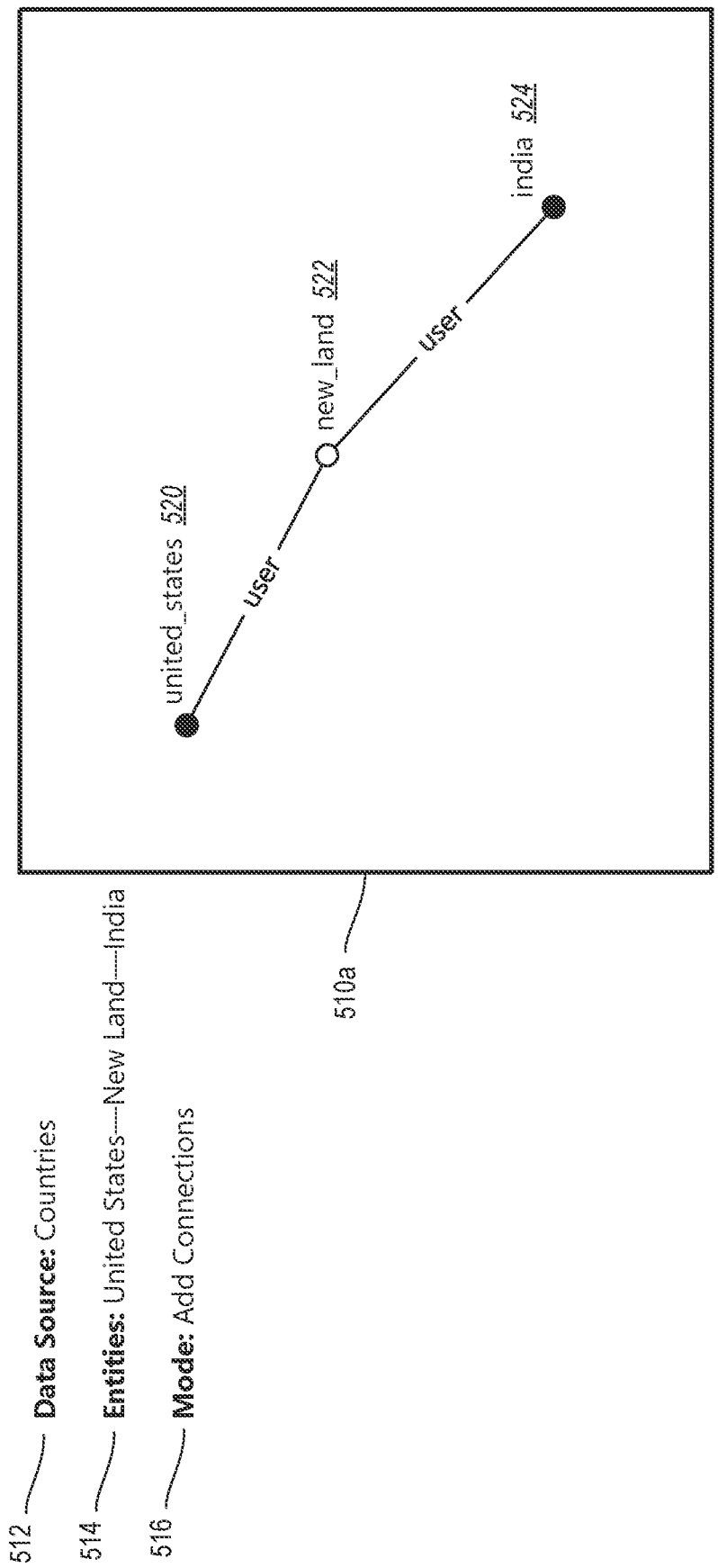
FIGS. 5A-5B illustrate generating an updated network graph that suggests adding entities and connections in accordance with one or more implementations.
Figure 5B:
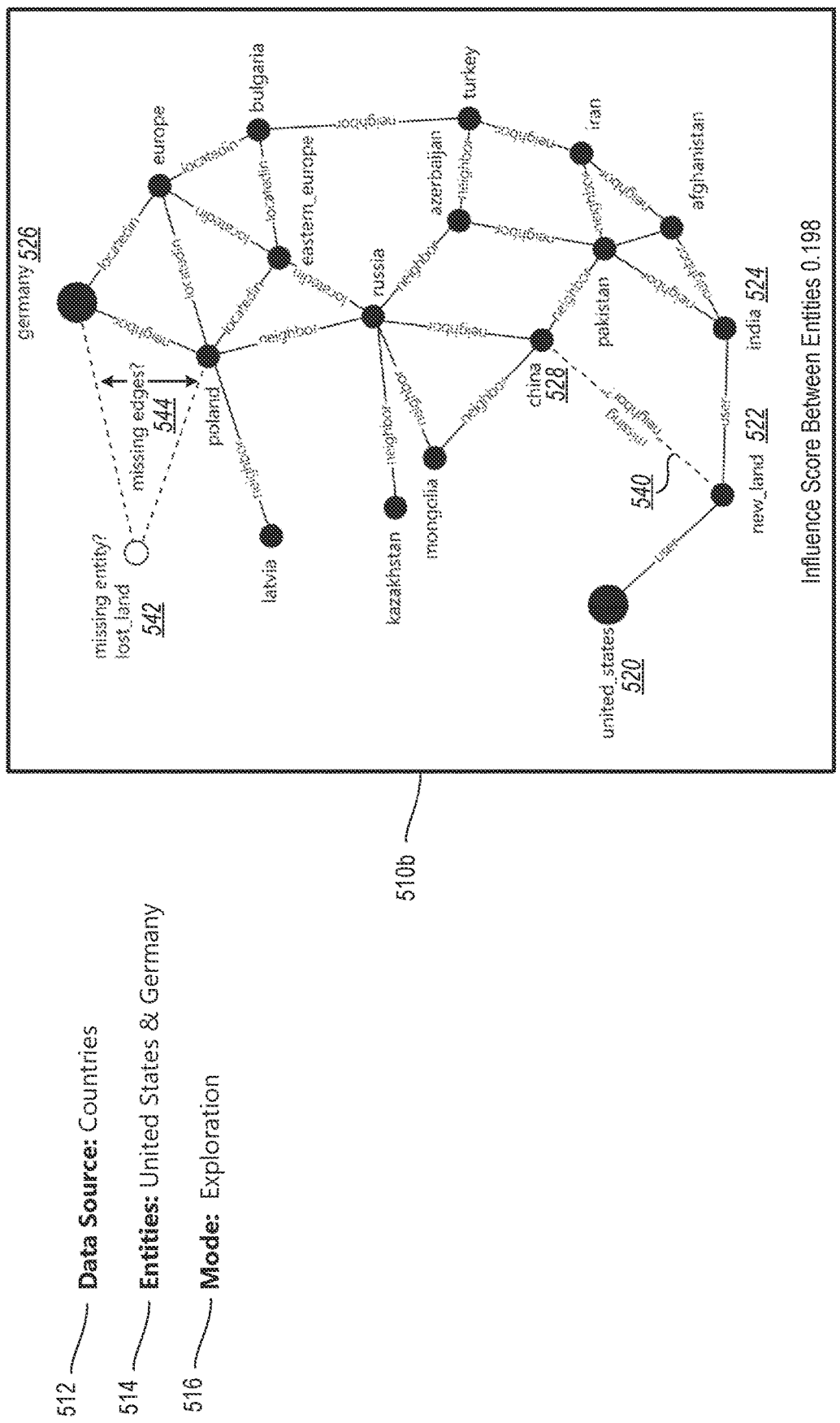

FIGS. 5A-5B illustrate generating an updated network graph that suggests adding entities and connections in accordance with one or more implementations. In particular, FIG. 5A corresponds to a user adding a new node to a network graph 510a. For example, as shown in FIG. 5A, the data source 512 lists "countries," the entities 514 lists "United States-New Land-India," and the mode 516 lists "add connections." Accordingly, upon determining that the network graph includes the country nodes of the United States and India, the interactive graphing system 106 adds a new country node, New Land node 522, corrected to the United States node 520 and the India node 524.

In some implementations, the interactive graphing system 106 designates a user-added edge as "user" indicating that the user added the edge. In various implementations, the interactive graphing system 106 automatically generates the relationship type (e.g., label). Additionally, the interactive graphing system 106 can enable a user to add or edit the relationship type between nodes. In example implementations, the interactive graphing system 106 includes multiple relationship types. For example, the interactive graphing system 106 includes both the labels of "user" and "neighbor" for a user added connection link (i.e., edge).

As shown, FIG. 5A includes a network graph 510a that includes the United States node 520 and the India node 524 connected via the New Land node 522 (e.g., the user added node). The connection links are also labeled with "user" to indicate that the user added the New Land node 522 between the United States node 520 and the India node 524.

Upon detecting the user modification to the network graph 510a, the interactive graphing system 106 can store the user action and use it, in part, to further modify the network graph 510a. To illustrate, FIG. 5B shows the interactive graphing system 106 suggesting new entities and connections in an updated network graph 510b.

For context, FIG. 5B shows a data source 512 of "Countries," the entities 514 of "United States & Germany," and a mode 516 of "Exploration." Indeed, by providing the updated network graph 510b in the exploration mode, the interactive graphing system 106 provides a contextual landscape around the selected entities. In some implementations, the interactive graphing system 106 automatically provides the updated network graph 510b as shown in response to detecting user data modifying a network graph and further updating the network graph (e.g., the interactive graphing system 106 runs a query in the background that includes the data source 512, the entities 514, and the mode 516 shown in FIG. 5B).

As shown, the updated network graph 510b shows how the selected nodes of the United States and Germany are connected via other countries and geographical regions. As shown, the Germany node 526 connects to various country nodes across Eastern Europe before connecting with the India node 524. Because the user connected the India node 524 to the United States node 520 via the new land node 522, the interactive graphing system 106 can use this newly formed connection to connect the United States node 520 to the Germany node 526 as seen in the updated network graph 510*b*.

In addition, the updated network graph 510*b* includes additional suggestions provided by the interactive graphing system 106. For example, using one or more graph-based models, the interactive graphing system 106 determines to add a missing link 540 between the New Land node 522 and a China node 528. For example, the interactive graphing system 106 utilizes a path-based link prediction model influenced by the user data to determine the potential missing link 540. However, utilizing the same or similar graph-based model, the interactive graphing system 106 does not find enough support to suggest a missing link between the United States node 520 and the China node 528. Similarly, the missing link 540 between the New Land node 522 and a China node 528 may disappear if updates to the network graph change the context and support that supported the interactive graphing system 106 suggesting adding the missing link 540 (e.g., the user removes the Mongolia node and support is weakened to below a threshold level needed to suggest the missing link 540).

Further, in various implementations, the interactive graphing system 106 can determine a label for the missing link utilizing one or more of the graph-based models, as provided above. To illustrate, the interactive graphing system 106 suggests the label of "neighbor" for the missing link 540. In some implementations, the interactive graphing system 106 does not have enough supporting data and/or user data to suggest a node or link label (i.e., classification).

As another example, using one or more graph-based models, the interactive graphing system 106 determines to add a missing entity node called Lost Land (e.g., Lost Land node 542), which is recommended to be connected to the Germany node 526, the Poland node, or both as one or more missing edges 544.

In some implementations, the interactive graphing system 106 highlights (or otherwise emphasizes) the newly suggested nodes and connections added to the updated network graph 510*b*. For example, a user can quickly approve or reject each, some, or all suggestions. For instance, the interactive graphing system 106 adds the one or more missing edges 544 to the Last Land node 542 in a different color, line pattern, or line weight. Further, in example implementations, the interactive graphing system 106 provides options within an interactive interface for a user to accept, reject, or edit a suggestion.

Further, in various implementations, the interactive graphing system 106 provides reasoning or logic behind why a new node or connection was suggested to be added to the updated network graph 510*b*, including if there were any thresholds that were first satisfied (or almost satisfied). For example, the interactive graphing system 106 reports back the one or more graph-based models utilized to determine a suggestion and/or what conditions were met to warrant or support the suggestion.

Figure 6A:
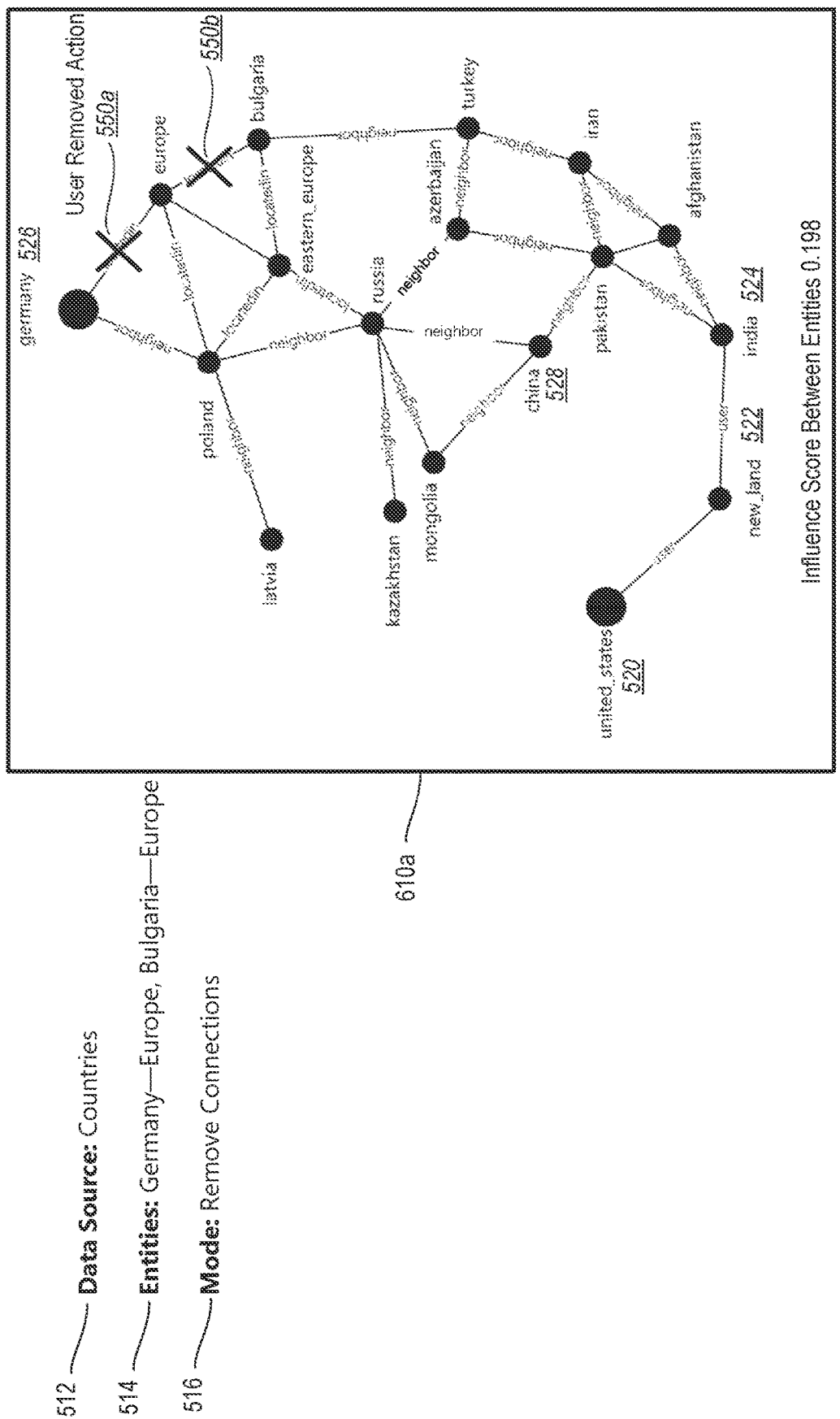
FIGS. 6A-6C illustrate generating an updated network graph that suggests removing entities and connections in accordance with one or more implementations.
Figure 6B:
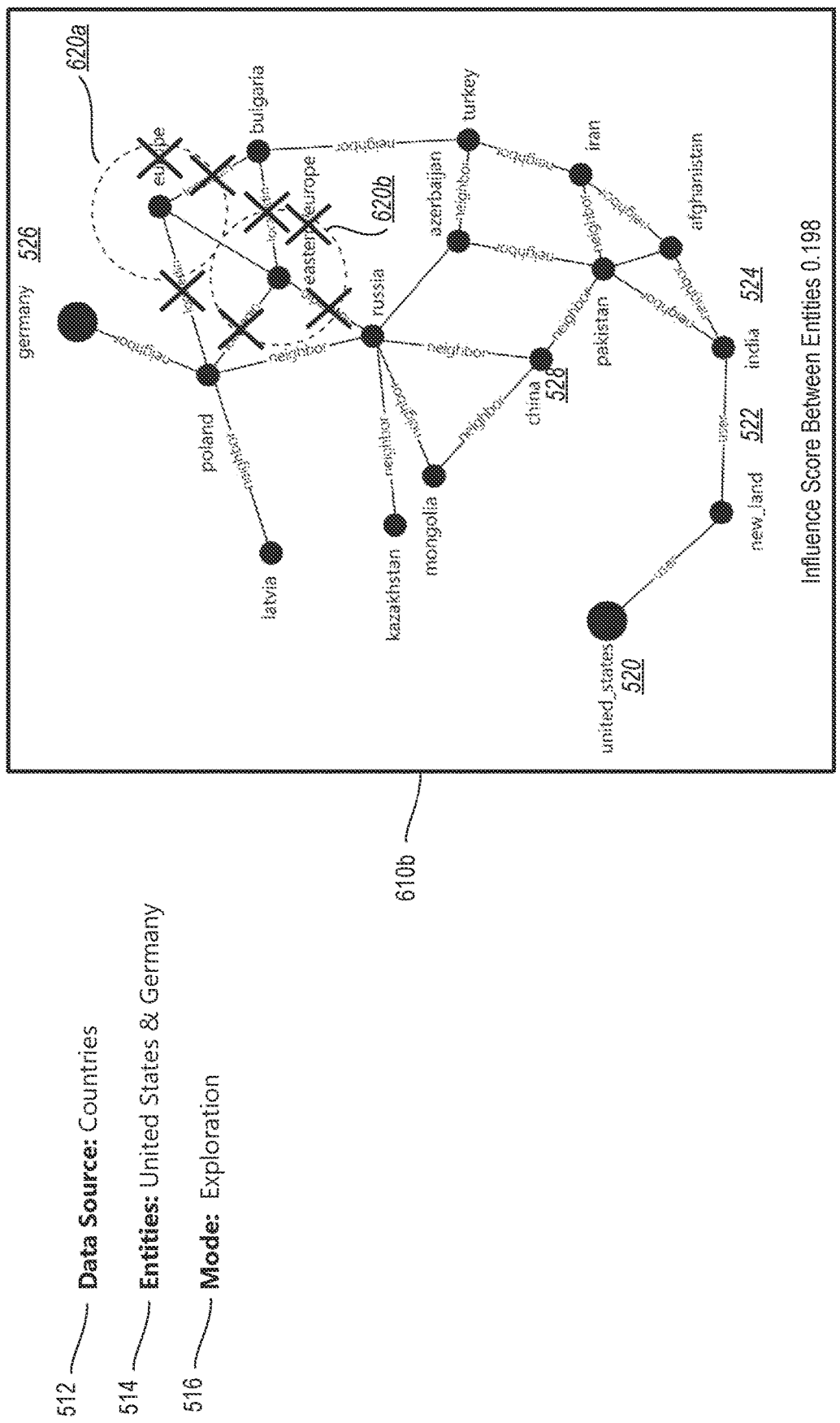
Figure 6C:
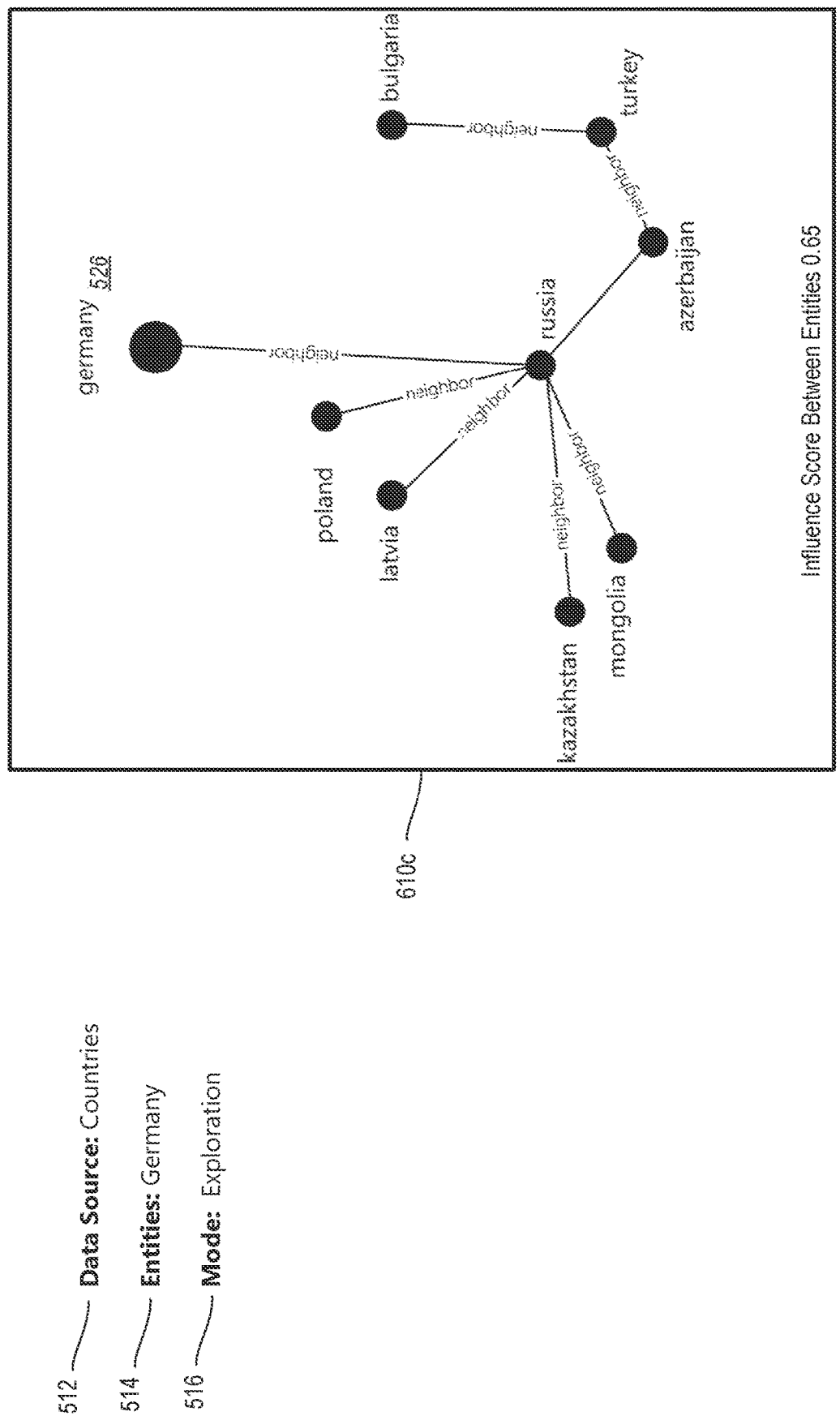

FIGS. 6A-6C illustrate generating an updated network graph that suggests removing entities and connections in accordance with one or more implementations. In particular, FIG. 6A shows a user removing connections in a network graph 610*a*. For context, FIG. 6A includes a data source 512 of "Countries," entities 514 of "Germany-Europe, Bulgaria-Europe," and a mode 516 of "Remove Connections."

As a result of the user actions, the interactive graphing system 106 updates the network graph 610*a* to remove the connections between the Germany node 526 and the Europe node as well as between the Bulgaria node and the Europe node, which is shown in the network graph 610*a* in FIG. 6A as a first user removed action 550*a* and a second user removed action 550*b* for proposes of explanation. In alternative implementations, the network graph 610*a* omits the removed links missing.

In response, the interactive graphing system 106 can detect the user input and provide further updates to the network graph 610*a*. To illustrate, FIG. 6B shows the interactive graphing system 106 suggesting removing entities and connections in an updated graph 610*b*.

More specifically, as shown in the updated graph 610*b*, the interactive graphing system 106 suggests removing additional entities (i.e., nodes) and connections (i.e., edges) based on the detected user action. For example, based on the user action of removing connections between the Germany node 526 and the Europe node as well as between the Bulgaria node and the Europe node, the interactive graphing system 106 determines to remove additional connections between other country nodes and the Europe node. To illustrate, the first target area 620*a* of the updated network graph 610*b* shows connections to the Europe node removed. With no connections, in some instances, the interactive graphing system 106 also removes the Europe node. In alternative implementations, the interactive graphing system 106 maintains the Europe node but with no connections.

In various implementations, when a user adds or removes a connection, the interactive graphing system 106 can determine from the user action the reason for the removal. For example, the interactive graphing system 106 determines that the user removed the connections between the Germany node 526 and the Europe node as well as the connection between the Bulgaria node and the Europe node because the user was not interested in the "located in" characteristics between country nodes and the Europe node. Accordingly, the interactive graphing system 106 identifies and removes other connections in the network graph that have this same undesirable characteristic.

In one or more implementations, the interactive graphing system 106 recognizes short-term patterns of user actions, such as the one described above. In some implementations, the interactive graphing system 106 analyzes user profile data to detect longer-term patterns and intents of the user. For example, the interactive graphing system 106 determines from a user action log that this particular user does not prefer multiple entity levels for graphs of a particular subject matter. Accordingly, the interactive graphing system 106 may suggest removing links and nodes that correspond to one node being a subset or belonging within another node.

To illustrate this latter concept, the updated graph 610*b* includes a second target area 620*b* that removes the Eastern Europe node along with connections having "located in" characteristics with country nodes. Indeed, based on user profile data, the interactive graphing system 106 (e.g., via a path-based link removal model) determines to remove connections between the Eastern Europe node and the country nodes of Poland, Bulgaria, and Russia.

Stated differently, in various implementations, the interactive graphing system 106 can identify a target characteristic of a first connection or edge. Then, the interactive graphing system 106 can determine from the user profile, user data corresponding to the first characteristic, such as previous instances of edges having the target characteristic being removed from one or more network graphs. Then, based on the user data, the interactive graphing system 106 can generate an updated network graph utilizing a graph-based model that removes one or more edges in the modified network graph that have the target characteristic.

In some implementations, the interactive graphing system 106 uses additional factors, such as recency, graph proximity, network graph type or subject matter, etc. In various implementations, the interactive graphing system weights one or more factors to determine when to automatically apply in action, such as removing nodes or connections to generate an updated network graph.

As also shown in FIG. 6B, the updated graph 610b includes an influence score between entities. For example, in various implementations, the interactive graphing system 106 determines influence scores between each entity pairing. In some instances, an influence score for one or more individual pairs is shown. In various instances, the interactive graphing system 106 combines the influence scores for the entities shown and includes them with an updated graph.

In some implementations, the interactive graphing system 106 responds to detected user modifications (and/or system updates) by changing the appearance of the network graph. To illustrate, FIG. 6C shows the network graph suggesting a zoom adjustment in the updated network graph 610c. For context, FIG. 6C includes a data source 512 of "Countries," entities 514 of "Germany," and a mode 516 of "Exploration." Note, unlike the previous figure, the entities 514 no longer include the United States. Because the network graph is based on the entity of "Germany," the Germany node 526 is shown as larger (e.g., node size can represent the relevance and/or importance of nodes in a given network graph).

For example, in response to the user action that includes interactions with a subset of a network graph, the interactive graphing system 106 focuses an updated network graph 610c on a smaller more isolated region (and thus runs graph-based models more efficiently by only considering a local subgraph). Here, while previous user and system edits are still maintained by the interactive graphing system 106 (e.g., the United States node is connected to the India node in the Countries dataset), the interactive graphing system 106 can visually (and computationally) simplify the updated network graph 610c based on inferred user intent, as determined from the user profile data.

In particular, the updated network graph 610c in FIG. 6C shows a network graph after the changes in connection with FIG. 6B are applied. As noted above, in some implementations, the interactive graphing system 106 can apply multiple graph-based models and/or multiple iterations of one or more of these models before providing suggestions to a user. Thus, in one implementation, upon detecting the user action provided above in connection with FIG. 6A, the interactive graphing system 106 automatically determines and applies the changes shown in connection with FIG. 6B as well as the change shown in FIG. 6C before displaying the updated network graph 610c to the user within an interactive interface (or another graphical user interface). In alternative implementations, the interactive graphing system 106 first shows the user the updated graph 610b from FIG. 6B, then later shows the user the updated network graph 610c from FIG. 6C (e.g., automatically or based on selecting an option for the network graph to be automatically updated).

While FIG. 6C shows the interactive graphing system 106 updating the network graph by zooming into a target location or a subset of the network graph, in other implementations, the interactive graphing system 106 can zoom out or show additional entities and connections of a network graph. For instance, based on detected user action, the interactive graphing system 106 detects that a user is modifying a network graph by adding or expanding the graph. Based on this detected user action, the interactive graphing system 106 expands the network graph around the entities and/or region where the user action is detected.

Figure 7A:
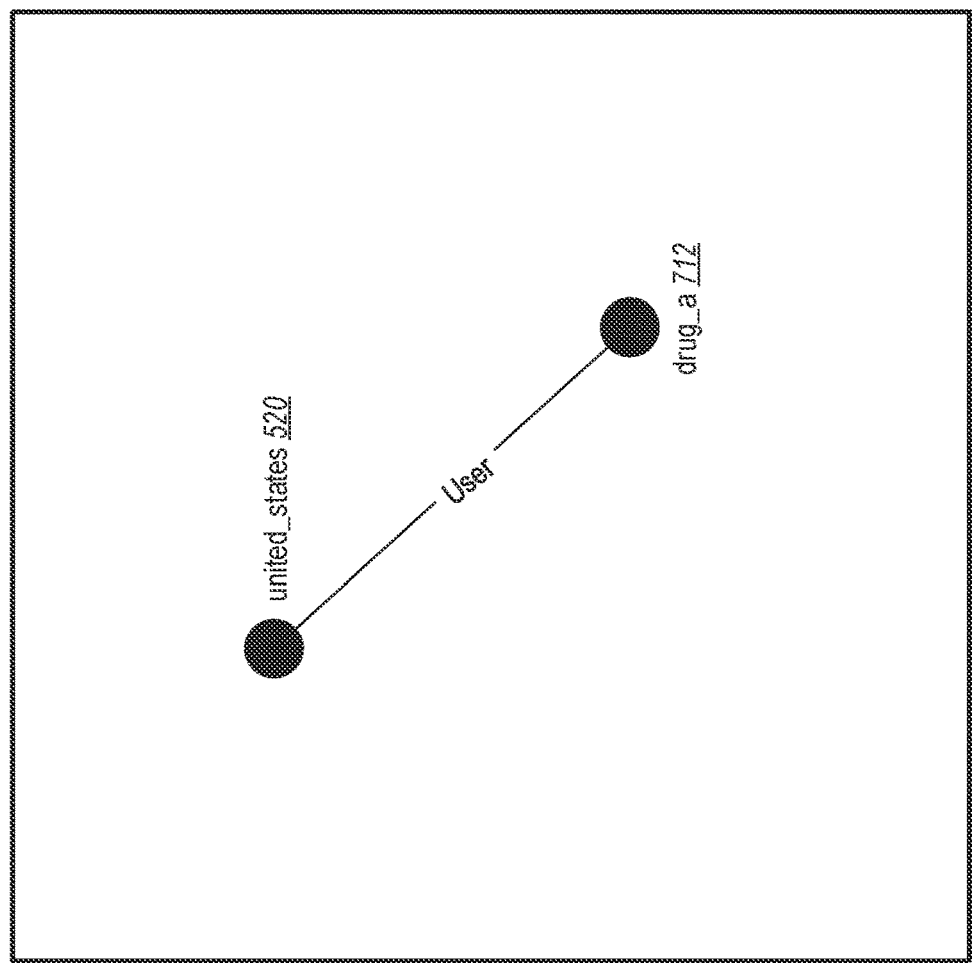
FIGS. 7A-7B illustrate generating an updated network graph with graph-based model suggestions for a combined network graph in accordance with one or more implementations.
Figure 7B:
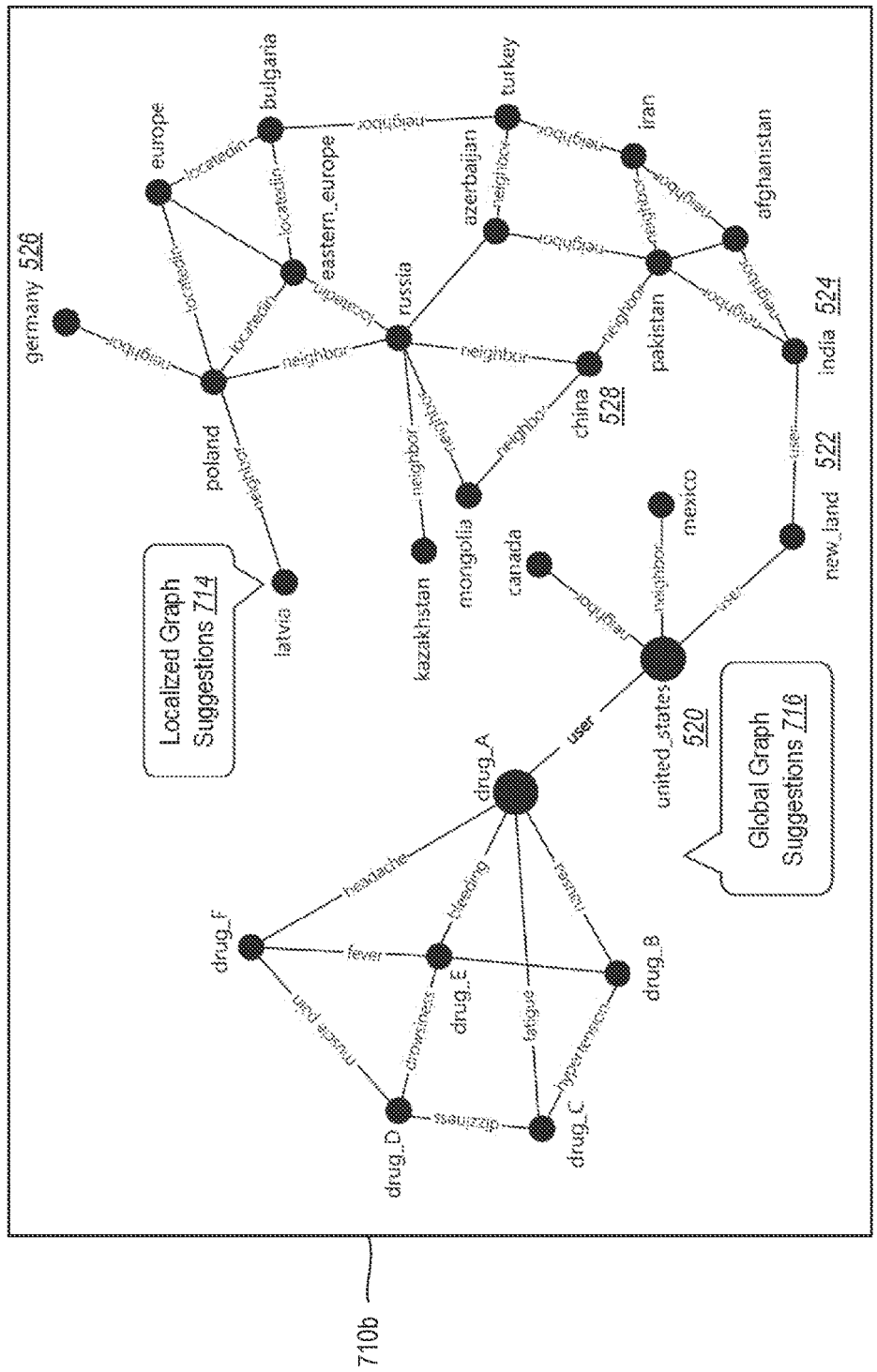

As indicated above, the interactive graphing system 106 allows a user to combine separate network graphs together to form a combined network graph. To illustrate, FIGS. 7A-7B show generating an updated network graph with graph-based model suggestions for a combined network graph in accordance with one or more implementations. In particular, FIG. 7A shows the results of a user adding a new node between two datasets.

For context, FIG. 7A includes a data source 512 of "Countries, Drug Side Effects," entities 514 of "United States-Drug A," and a mode 516 of "Add Connections." Indeed, as shown, a user selects a first dataset corresponding to countries in a second dataset corresponding to drug side effects and provides a request for the interactive graphing system 106 to create a new connection between the United states node 520 from the countries dataset with the Drug A node 712 of the drug side effect dataset, as shown in the network graph 710a. In particular, the network graph 710a shows the United states node 520 connected to the drug a node 712 with a connection with a user label.

In some implementations, the interactive graphing system 106 enables a user to add one node from a first dataset to a new node. Then, the interactive graphing system 106 facilitates connecting a second node from a second dataset to the new node. As a result, the first node is indirectly connected to the second node and the first dataset is indirectly connected to the second dataset. In some implementations, the interactive graphing system 106 enables a user to add nodes from different datasets directly to each other. When two or more datasets are connected, the interactive graphing system 106 can treat the combined network graph as a single graph for purposes of graph-based model processing and automatically generating suggestions.

To illustrate, FIG. 7B shows the interactive graphing system 106 providing a combined network graph 710b that includes entities (i.e., nodes) from two separate network graphs (e.g., datasets), or at least subsets of two separate network graphs along with suggestions determined from running graph-based models on the combined network graph 710b. For context, FIG. 7B includes a data source 512 of "Countries, Drug Side Effects," entities 514 of "United States & Drug A," and a mode 516 of "Exploration." Indeed, as with FIG. 7A, the interactive graphing system 106 accesses data from multiple datasets to display a single combined network graph 710b.

To illustrate, the combined network graph 710b shows the Drug A node 712 connected to the United states node 520 in a manner that connects at least a portion of the drug side effects dataset with the countries dataset. In addition, the combined network graph 710b can include localized graph suggestions 714. To elaborate, because of the additional information provided by entities in a second dataset, the interactive graphing system 106 may be able to discover additional insights with respect to two entities on the first dataset. In this manner, the interactive graphing system 106 may be able to discover and suggest previously hidden or undiscoverable suggestions with respect to a dataset by running the combined network graph 710b through one or more graph-based models.

Similarly, the combined network graph 710b includes global graph suggestions 716. In various implementations, the interactive graphing system 106 can run the combined network graph 710b through one or more graph-based models one or more times to discover new connections, discoveries, and suggestions between nodes of the two (or more) former separate datasets (e.g., suggestions not possible or discoverable by running the same graph-based models each the datasets separately). For example, the interactive graphing system 106 suggests adding new nodes that connect drug nodes from the drug side effect network graph with country nodes from the countries dataset or suggest adding new connections (i.e., edges) between Drug X and Country Y based on non-obvious and previously hidden correlations. Indeed, algorithms of the graph-based models can change when processing the combined network graph 710*b* compared to processing single datasets independently.

To elaborate, by way of example, suppose Drug A is only available in the United States and researchers would like to know the possible effects of introducing Drug A into different countries. Accordingly, by adding new connections between Drug A and different countries, the researchers can see what possible side effects may arise in those different countries as well as if introducing Drug A to those countries changes the current side effects in the United States (e.g., to the United State node 520). These and other discoveries are now possible by creating a combined network graph 710*b* that can be efficiently subject to multiple graph-based models.

As mentioned above, the interactive graphing system 106 provides the combined network graph 710*b* to the graph-based models as a single network graph such that the graph-based models do not need to be modified in any way to process this new collection or fusion of data. As one example, a first graph-based model can process the combined network graph 710*b* without needing to further access the datasets corresponding to the nodes and edges. For instance, the interactive graphing system 106 generates the combined network graph 710*b* as a separate data structure and, in some instances, can save it as part of a session.

As another example, the interactive graphing system 106 provides the combined network graph 710*b* to a second graph-based model. If the second graph-based model needs to access the dataset corresponding to nodes in the combined network graph 710*b*, the interactive graphing system 106 can serve as a broker by accessing the separate datasets from their respective data sources and providing any requested information back to the second graph-based model. In this manner, the second graph-based model is unaware that the combined network graph 710*b* is formed from separate datasets.

In one or more implementations, the interactive graphing system 106 generates a new combined dataset that combines a first dataset and a second dataset along with any newly added nodes or edges. In these implementations, the interactive graphing system 106 can provide the combined dataset to one or more graph-based models for processing. Additionally, in some of these implementations, the combined dataset may be created temporarily to not waste memory resources.

As shown in FIG. 7B, the combined network graph 710*b* is a combination of two network graphs. In some implementations, the combined network graph 710*b* can include any number of network graphs combined together. In this manner, the interactive graphing system 106 provides a powerful tool to users for discovering and exploring combinations and correlations between different datasets that previously have been impossible.

Figure 8:
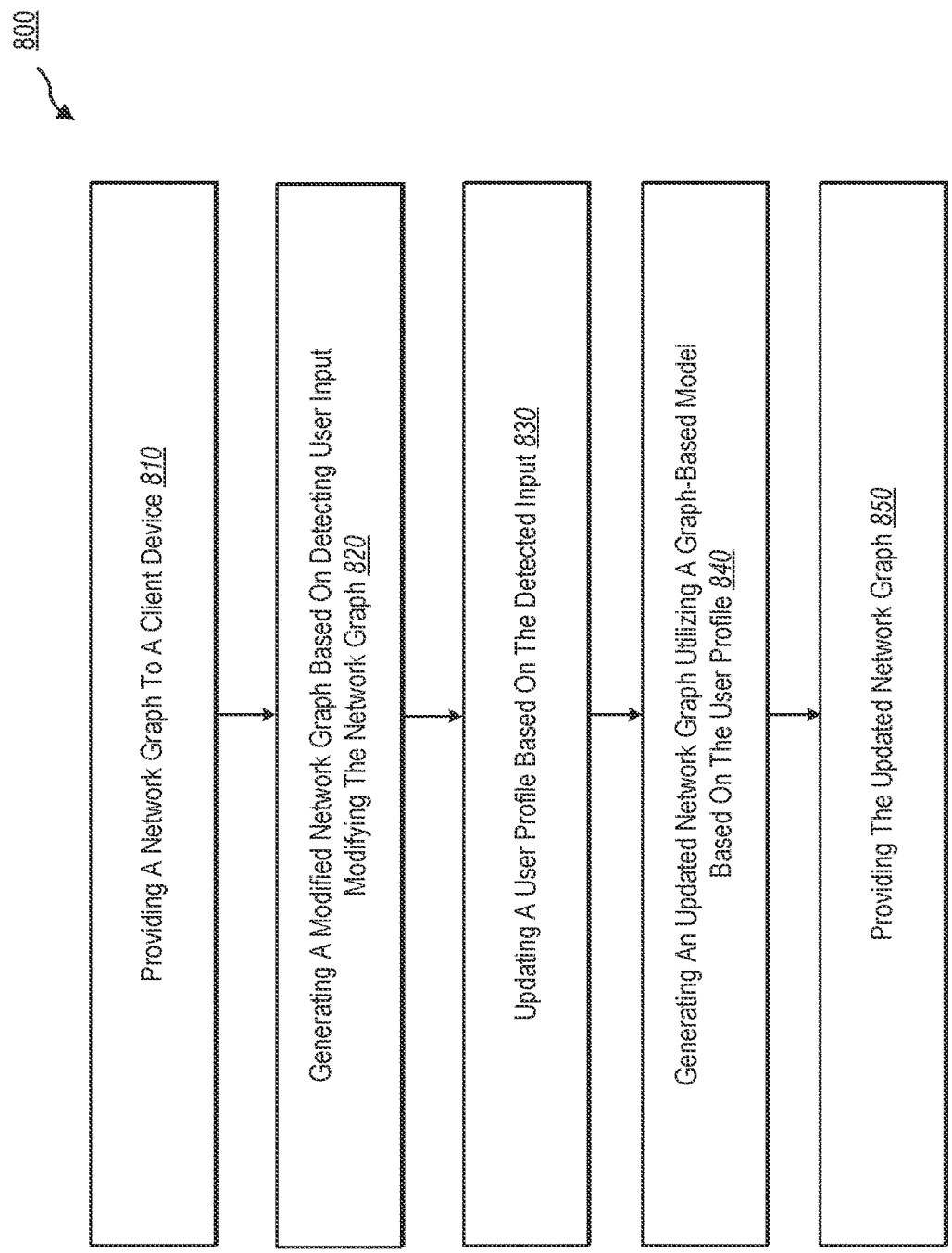
FIG. 8 illustrates example series of acts for generating and providing an automatically updated network graph based on user actions in accordance with one or more implementations.

Turning now to FIG. 8, this figure illustrates example flowcharts including a series of acts 800 for implementing and/or utilizing the interactive graphing system 106 in accordance with one or more implementations. While FIG. 8 illustrates acts according to one or more implementations, alternative implementations may omit, add to, reorder, and/or modify any of the acts shown. Further, the acts of FIG. 8 can be performed as part of a method. Alternatively, a non-transitory computer-readable medium can include instructions that, when executed by one or more processors, cause a computing device to perform the acts of FIG. 8. In still further implementations, a system can perform the acts of FIG. 8.

For example, FIG. 8 illustrates a series of acts 800 for generating and providing an automatically updated network graph in accordance with one or more implementations. As shown, the series of acts 800 includes an act 810 of providing a network graph to a client device. For instance, the act 810 may include providing an interactive interface displaying a network graph comprising nodes and edges connecting the nodes. In one or more implementations, the act 810 includes building the network graph based on one or more data sources.

In some implementations, the user input includes a graph dataset, a graph entity, a graph mode, and/or an iteration state variable; the graph-based model includes an exploration function, a path connectivity function, and a group connectivity function; the graph-based model includes a new node prediction model, a path-based link prediction model, an edge prediction model, or a node classification model; and/or the network graph includes a multiplex graph, a heterogeneous graph, a hypergraph, or a directed graph As further shown, the series of acts 800 includes an act 820 of generating a modified network graph based on detecting user input modifying the network graph. For example, the act 820 may involve generating a modified network graph based on detecting user input modifying a network graph. In some implementations, the act 820 includes detecting a user input modifying one or more nodes of the network graph to create a modified network graph. In some implementations, the act 820 includes adding or removing a node or edge from the network graph.

As further shown, the series of acts 800 includes an act 830 of updating a user profile based on the detected input. For example, the act 830 may include updating a user profile based on detecting the user input. In some implementations, the act 830 includes supplementing a user profile to indicate the modification to the one or more nodes. In various implementations, the user profile includes a plurality of network graph modifications corresponding to the network graph; the user profile includes a plurality of network graph modifications corresponding to a plurality of different network graphs; the user profile includes a plurality of network graph modifications corresponding to a plurality of different network graphs; and/or the user profile includes a plurality of network graph modifications corresponding to the network graph.

As further shown, the series of acts 800 includes an act 840 of generating an updated network graph utilizing a graph-based model based on the user profile. For example, the act 840 may involve generating an updated network graph utilizing a graph-based model based on the modified network graph and the updated user profile. In one or more implementations, the act 840 includes generating an updated network graph utilizing a graph-based model based on the modified network graph and the user profile in response to the user input. In example implementations, the act 840 includes displaying a subset of nodes located adjacent to the removed node while hiding other nodes on the network graph; and/or changing a first node of the network graph that is different from a second node changed based on the user input. In some implementations, the user input modifies a first node and the updated network graph includes modifications to a second node that is different from the first node.

As further shown, the series of acts 800 includes an act 850 of providing the updated network graph in response to detecting the user input modifying the network graph. For example, the act 850 may include providing the updated network graph in response to detecting the user input modifying the network graph. In some implementations, the act 850 includes updating the interactive interface to display the updated network graph in response to detecting the user input modifying the one or more nodes of the network graph. In various implementations, the act 850 includes displaying the interactive interface on a graphical user interface of a client device associated with a user who provided user input to request a network graph and/or an updated network graph.

In some implementations, the series of acts 800 includes additional acts. For example, in certain implementations, the series of acts 800 includes generating the modified network graph by removing a first edge from the network graph; identifying a target characteristic of the first edge; determining, from the user profile, previous instances of edges having the target characteristic being removed from the network graph; and generating the updated network graph utilizing the graph-based model by removing one or more edges in the modified network graph that have the target characteristic.

In some implementations, the series of acts 800 includes generating the modified network graph by adding an edge between a first node of a first network graph and a first node of a second network graph, where the first network graph and the second network graph are unrelated; and generating the updated network graph by utilizing the graph-based model to process a combined network graph including the first network graph and the second network graph and determining an additional correlation between the first network graph and the second network graph.

In various implementations, the series of acts 800 includes generating the modified network graph by adding a new node to the network graph; and generating the updated network graph utilizing the graph-based model by determining one or more new edges between the new node and one or more other nodes on the network graph and supplementing the modified network graph with the one or more new edges. In example implementations, the series of acts 800 includes detecting additional user input further modifying the updated network graph, and generating a further updated network graph utilizing an additional graph-based model based on the further modified network graph and the further modified user profile.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the interactive graphing system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 9:
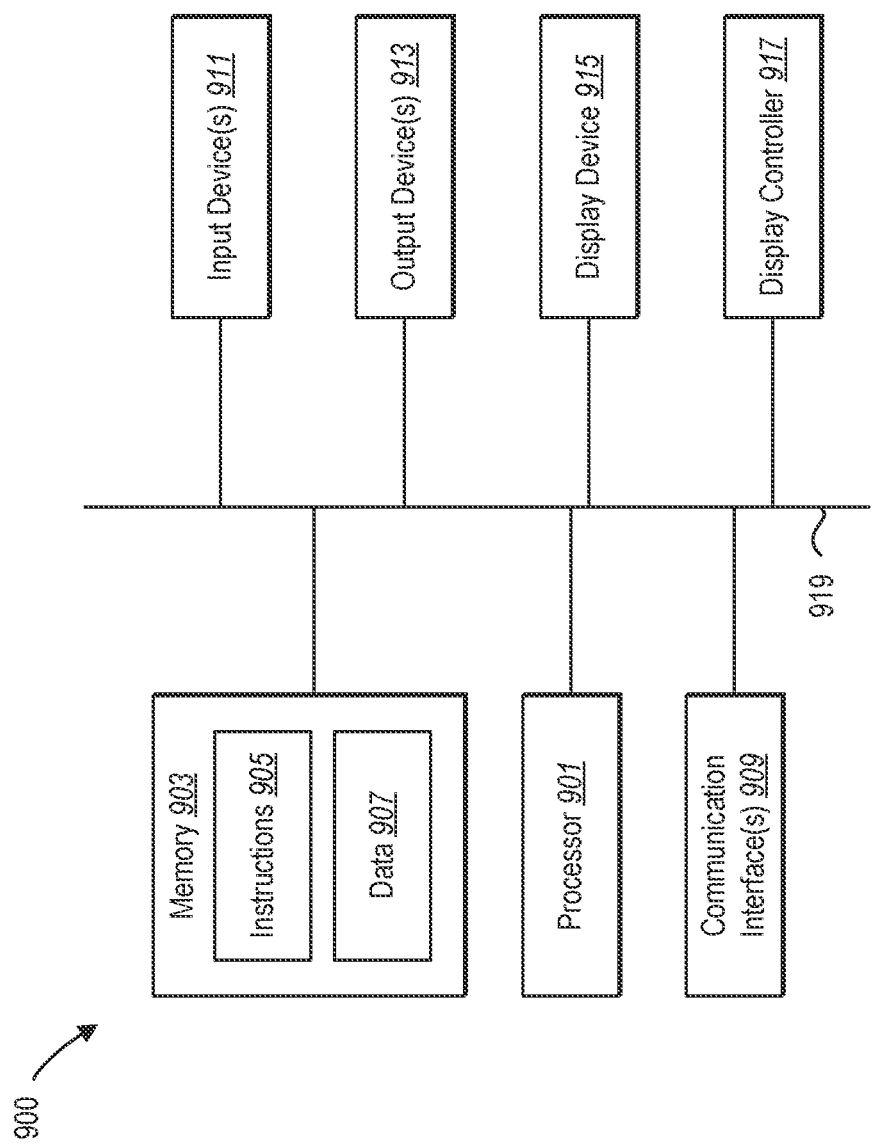
FIG. 9 illustrates certain components that may be included within a computer system.

FIG. 9 illustrates certain components that may be included within a computer system 900. The computer system 900 may be used to implement the various computing devices, components, and systems described herein.

In various implementations, the computer system 900 may represent one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for inferring network graph updates comprising:
    maintaining a network graph that includes nodes and edges connecting the nodes;
    generating a modified network graph from the network graph based on detecting a user input modifying a node or edge of the network graph;
    generating an updated user profile for a user associated with the user input by adding the user input modifying the node or the edge of the network graph to a current user profile associated with the user, wherein the updated user profile includes user actions associated with multiple network graphs;
    determining a graph-based model from multiple graph-based models based on analyzing the user actions across the multiple network graphs within the updated user profile;
    generating an updated network graph, which further changes the modified network graph, utilizing the graph-based model determined based on the updated user profile; and
    providing the updated network graph in response to detecting the user input modifying the network graph.

2. The computer-implemented method of claim 1, wherein:
    generating the modified network graph comprises removing a target node at a target location from the network graph; and
    generating the updated network graph utilizing the graph-based model comprises displaying a subset of nodes located adjacent to the target location while hiding other nodes on the network graph.

3. The computer-implemented method of claim 1, wherein generating the updated network graph utilizing the graph-based model comprises changing a first node of the network graph, wherein the first node is different from a second node changed based on the user input.

4. The computer-implemented method of claim 1, further comprising:
    generating the modified network graph by removing a first edge from the network graph;
    identifying a target characteristic of the first edge;
    determining, from the updated user profile, previous instances of edges having the target characteristic being removed from the network graph; and
    generating the updated network graph utilizing the graph-based model by removing one or more edges in the modified network graph that have the target characteristic.

5. The computer-implemented method of claim 1, wherein:
    generating the modified network graph comprises adding a new edge between a first node of a first network graph and a first node of a second network graph, the first network graph and the second network graph being unrelated; and
    generating the updated network graph comprises:
        utilizing the graph-based model to process a combined network graph comprising the first network graph and the second network graph; and
        determining an additional correlation between the first network graph and the second network graph.

6. The computer-implemented method of claim 1, wherein the user input comprises a graph dataset, a graph entity, a graph mode, and an iteration state variable.

7. The computer-implemented method of claim 1, wherein:
    generating the modified network graph comprises adding a new node to the network graph; and
    generating the updated network graph utilizing the graph-based model comprises:
        determining one or more new edges between the new node and one or more other nodes on the network graph; and
        supplementing, without additional user input, the modified network graph with the one or more new edges.

8. The computer-implemented method of claim 1, further comprising:
    detecting an additional user input further modifying the updated network graph; and
    generating a further updated network graph utilizing an additional graph-based model based on the modified network graph and the updated user profile.

9. The computer-implemented method of claim 1, wherein the graph-based model comprises an exploration function, a path connectivity function, and a group connectivity function.

10. The computer-implemented method of claim 1, wherein the graph-based model comprises a new node prediction model, a path-based link prediction model, or a node classification model.

11. The computer-implemented method of claim 1, wherein the current user profile comprises a plurality of network graph modifications corresponding to the network graph.

12. The computer-implemented method of claim 1, wherein the current user profile comprises a plurality of network graph modifications corresponding to a plurality of different network graphs.

13. A system comprising:
    at least one processor; and
    a non-transitory computer memory comprising instructions that, when executed by the at least one processor, cause the system to:
        maintain a network graph that includes nodes and edges connecting the nodes;
        generate a modified network graph from the network graph based on detecting a user input modifying a node or edge of the network graph;
        generate an updated user profile for a user associated with the user input by adding the user input modifying the node or the edge of the network graph to a current user profile associated with the user, wherein the updated user profile includes user actions associated with multiple network graphs;

determine a graph-based model from multiple graph-based models based on analyzing the user actions across the multiple network graphs within the updated user profile;

generate an updated network graph, which further changes the modified network graph, utilizing the graph-based model based on the updated user profile; and provide the updated network graph in response to detecting the user input modifying the network graph.

14. The system of claim 13, wherein the user input comprises a graph dataset, a graph entity, and a graph mode.

15. The system of claim 13, wherein the network graph comprises a multiplex graph, a heterogeneous graph, a hypergraph, or a directed graph.

16. The system of claim 13, further comprising building the network graph based on one or more data sources.

17. A computer-implemented method for inferring network graphs updates comprising:

providing an interactive interface displaying a network graph comprising nodes and edges connecting the nodes;

detecting a user input modifying one or more nodes of the network graph to create a modified network graph;

generating a supplemented user profile for a user associated with the user input by adding the user input modifying the one or more nodes to a current user profile associated with the user;

in response to the user input, determining an inferred network graph action by analyzing a plurality of user inputs including the user input stored in the supplemented user profile;

selecting a graph-based model from multiple graph-based models that performs the inferred network graph action determined based on the user input within the supplemented user profile;

generating an updated network graph that applies the inferred network graph action to the modified network graph by utilizing the graph-based model selected from the multiple graph-based models; and updating the interactive interface from displaying the network graph to displaying the updated network graph in response to detecting the user input modifying the one or more nodes of the network graph.

18. The computer-implemented method of claim 17, wherein the user input modifies a first node and the updated network graph includes modifications to a second node that is different from the first node.

19. The computer-implemented method of claim 17, wherein the current user profile comprises a plurality of network graph modifications corresponding to the network graph.

20. The computer-implemented method of claim 17, wherein the current user profile comprises a plurality of network graph modifications corresponding to a plurality of different network graphs.

* * * * *